United States Patent [19]
Takahashi et al.

[11] Patent Number: 5,299,070
[45] Date of Patent: Mar. 29, 1994

[54] DIGITAL SIGNAL REPRODUCING SYSTEM FOR PROCESSING THE REPRODUCED DIGITAL SIGNAL WITH THE MOST FAVORABLE ERROR RATE

[75] Inventors: Takao Takahashi; Noboru Murabayashi, both of Tokyo, Japan

[73] Assignee: Sony Corporation, Tokyo, Japan

[21] Appl. No.: 749,283

[22] Filed: Aug. 23, 1991

[30] Foreign Application Priority Data

Aug. 28, 1990 [JP] Japan ................... 2-225756

[51] Int. Cl.[5] .................... G11B 5/02; H03M 13/00
[52] U.S. Cl. ...................... 360/19.1; 360/25; 360/61; 371/41; 371/5.1
[58] Field of Search ............ 360/19.1, 65, 33.1, 360/39, 25, 61, 36.2, 43, 53; 371/41, 5.1, 5.5

[56] References Cited

U.S. PATENT DOCUMENTS

| | | | |
|---|---|---|---|
| 4,672,637 | 6/1987 | Halpern et al. | 375/96 |
| 4,841,385 | 6/1989 | Nakano | 360/65 |
| 4,951,283 | 8/1990 | Mester | 360/25 X |

FOREIGN PATENT DOCUMENTS

0309150A3  3/1989  European Pat. Off.
0368307A3  5/1990  European Pat. Off.

OTHER PUBLICATIONS

Patent Abstracts of Japan, vol. 12, No. 238 (P-726), Jul. 7, 1988, Kazuyuki.
Patent Abstracts of Japan, vol. 13, No. 269 (P-888) Jun. 21, 1989, Katsumi.
Patent Abstracts of Japan, vol 5, No. 11 (E-42) Jan. 23, 1981, Tetsuro.

*Primary Examiner*—Andrew L. Sniezek
*Attorney, Agent, or Firm*—William S. Frommer; Alvin Sinderbrand

[57] ABSTRACT

A digital signal played back from a record medium is supplied to plural processing circuits which exhibit respectively different characteristics to impart different error rates to the digital signal processed by each circuit. The processed digital signal having the most favorable error rate is detected and the processing circuit which produces that signal is selected for use with further circuitry which recovers information from the processed digital signal.

20 Claims, 19 Drawing Sheets

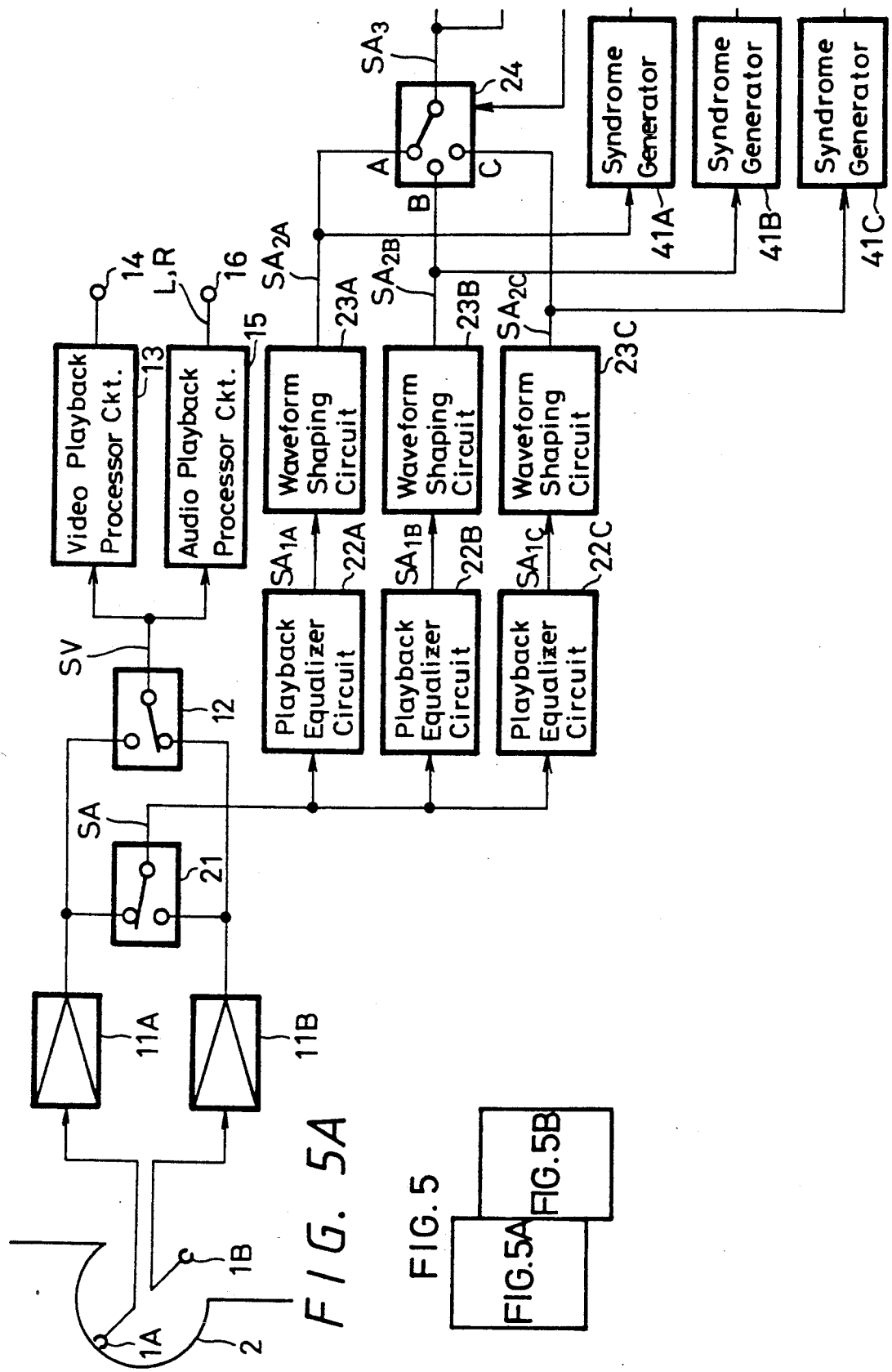

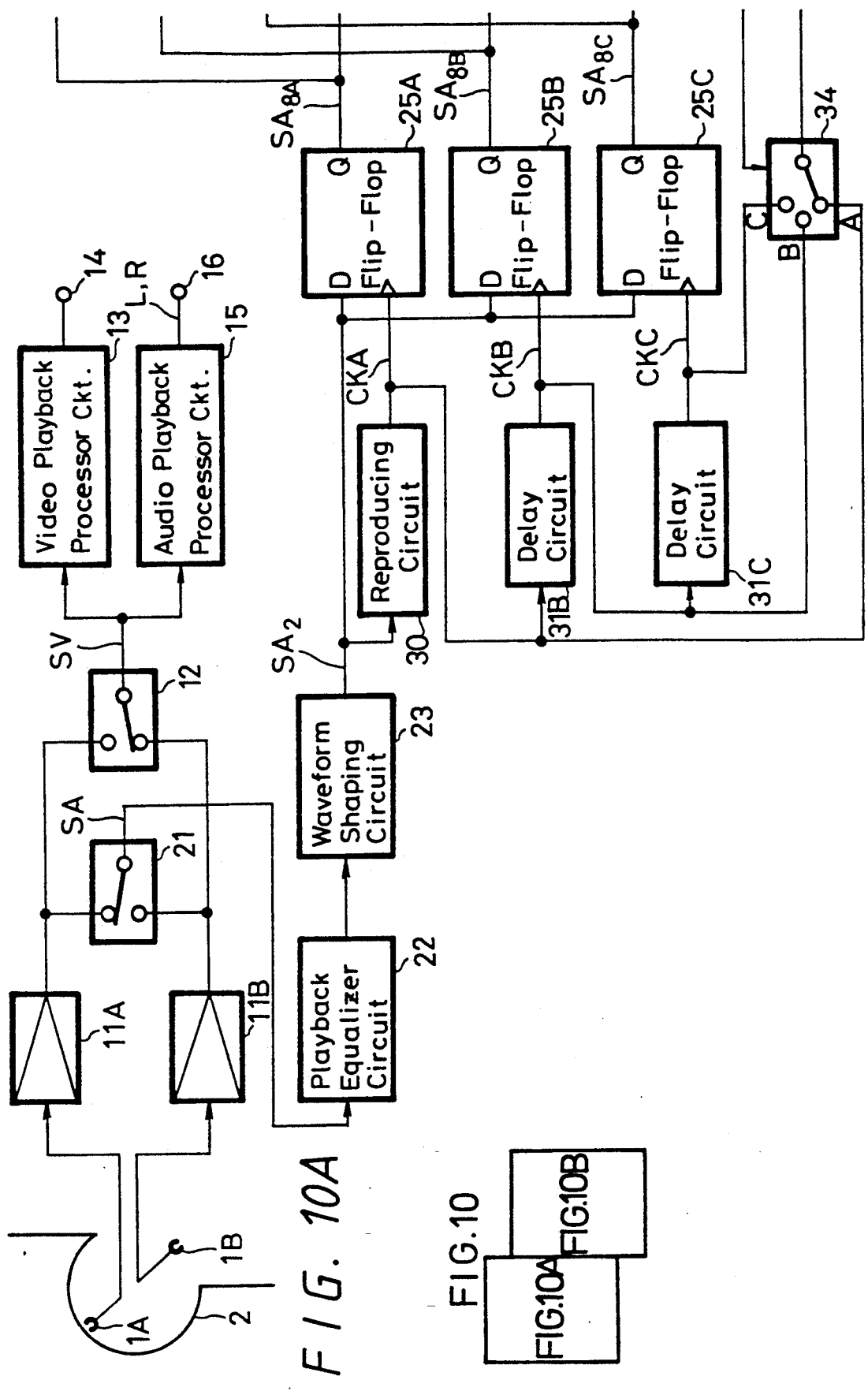

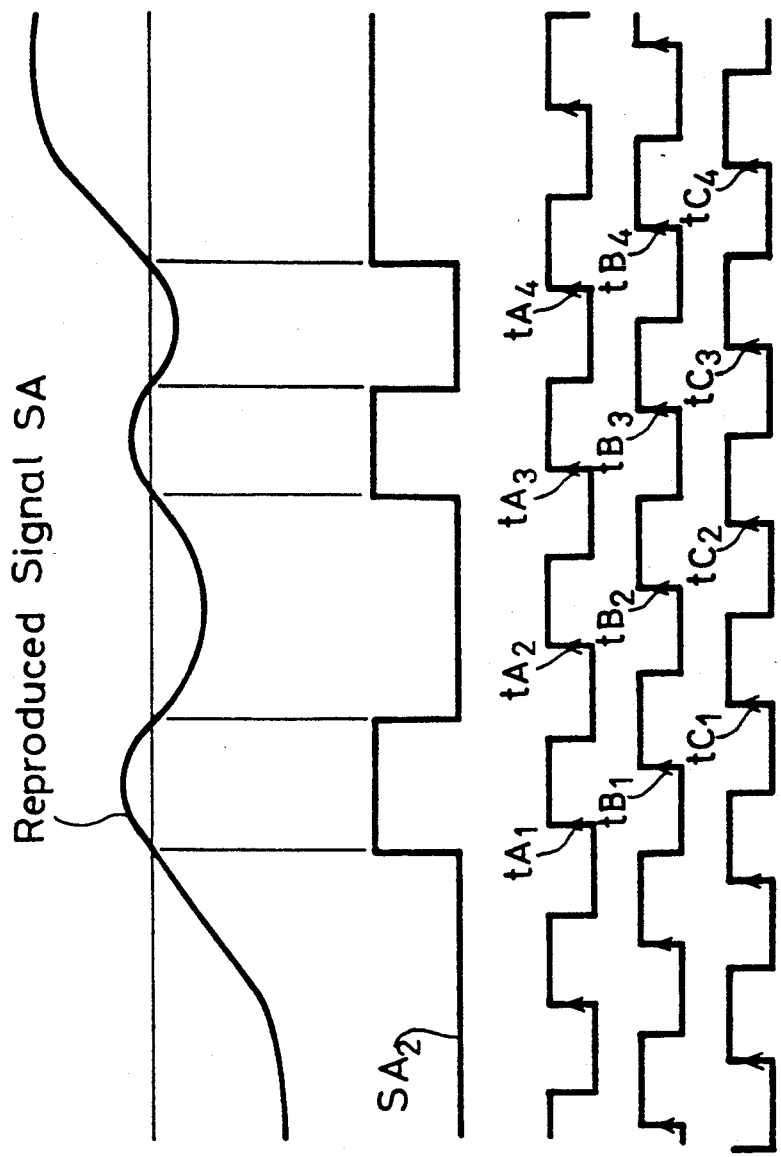

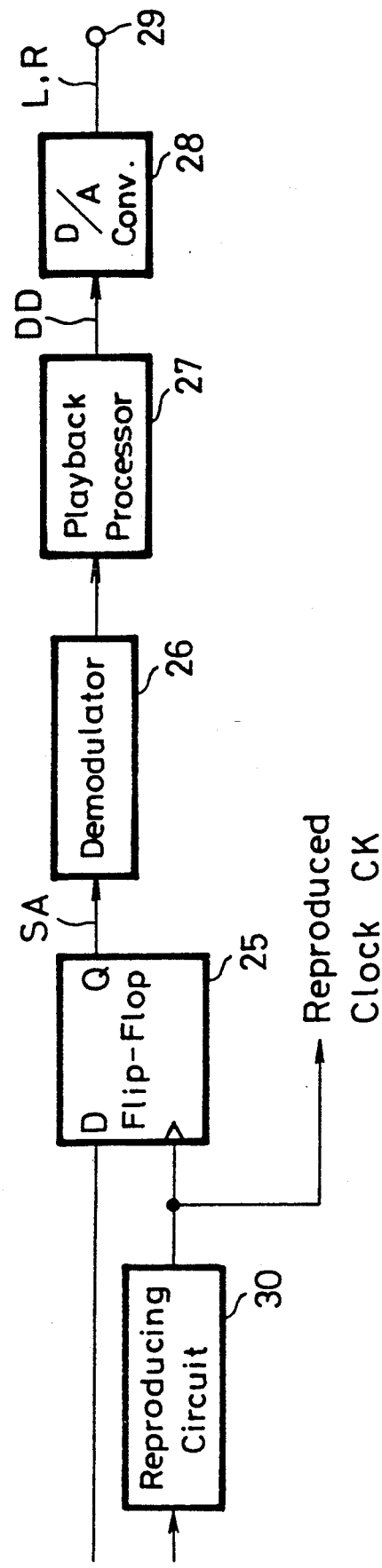

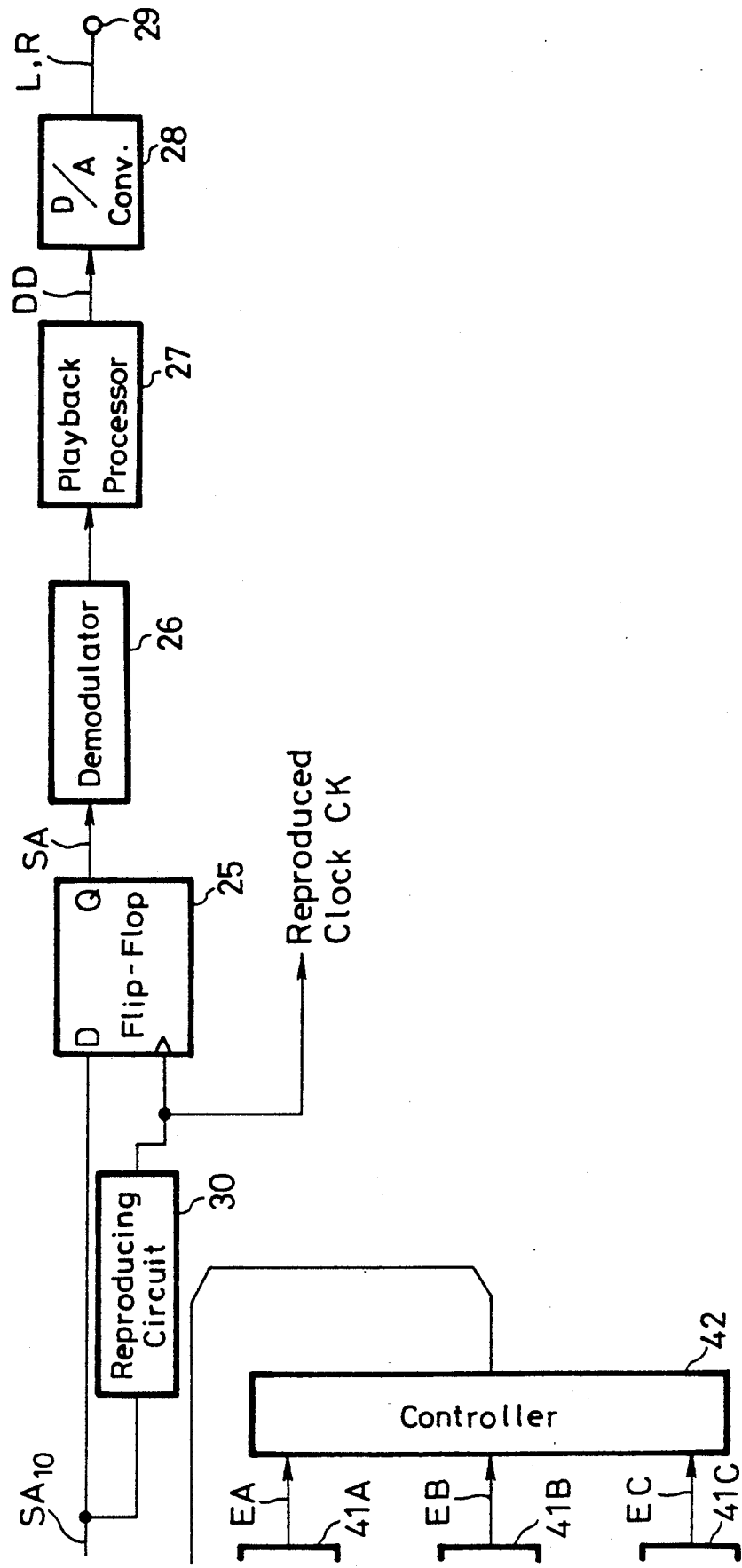

DIGITAL SIGNAL REPRODUCING SYSTEM FOR PROCESSING THE REPRODUCED DIGITAL SIGNAL WITH THE MOST FAVORABLE ERROR RATE

BACKGROUND OF THE INVENTION

This invention relates to digital signal reproducing apparatus and, more particularly, to such apparatus which is readily adaptable for use with a signal playback arrangement that may exhibit different transmission characteristics but, nevertheless, minimizes the error rate of the played back signals notwithstanding such different transmission characteristics.

In the field of video signal recording, a so-called 8-mm recording format has become popular. In 8-mm recording, both video and audio signals are recorded in slant tracks by rotary heads, with one field of video signals recorded in each track. Consistent with a standard which has developed, video and audio signals are frequency multiplexed for recording in a common track.

A typical frequency spectrum used with 8-mm recording is illustrated in FIG. 1. As shown, the frequency multiplexed signals are comprised of the combination of a frequency modulated luminance signal SF, a frequency-converted chrominance signal SC, FM audio signals SM and SS and pilot signals SP. The frequency modulated luminance signal is formed of a carrier which is frequency modulated with the luminance component SY such that the frequency representing the sync tip level is on the order of 5.7 MHz and the frequency which represents the white peak level of the luminance component is on the order of 7.7 MHz.

The frequency-converted chrominance signal is formed by frequency-converting the chrominance subcarrier to a relatively low range below that of the frequency modulated luminance component. The technique of providing a frequency modulated luminance component and a frequency-converted chrominance component has been long known to those of ordinary skill in the art.

The FM audio signal SM is comprised of a carrier that is frequency modulated with the sum (L+R) of the left-channel and right-channel stereophonic audio signals; and the frequency modulated audio signal SS is comprised of another carrier that is frequency modulated with the difference (L−R) between the left-channel and right-channel stereophonic signals. It is appreciated that, on reproduction, good stereophonic quality can be recovered from the FM audio signals SM and SS that have been recorded in a slant track.

The pilot signals SP are used for tracking servo control when the frequency-multiplexed combined signals are reproduced. As is conventional in 8-mm recording, a respective pilot signal whose frequency is one of four different pilot frequencies is recorded in each track such that when a playback head picks up a pilot signal from an adjacent track, the magnitude of that picked up signal is indicative of the tracking error of the head and the frequency of that signal represents the direction in which the head has drifted from its desired position. Thus, tracking control is attained as a function of pilot signal cross-talk components which are picked up when a given track is scanned.

FIG. 2 is a schematic illustration of slant tracks recorded on a magnetic tape 2 in the 8-mm format. Typically, a pair of diametrically opposed rotary heads is used to scan respective tracks across tape 2 which is wrapped about a tape drum with a wrap angle on the order of 221°. If one video field is recorded in one track, the heads are driven at the frame rate to reproduce a video frame at each complete rotation. The combined frequency-multiplexed FM luminance and converted chrominance signals components as well as the FM audio signals are recorded along an angular extent of 180° in that portion of each track identified as the video portion 2V. To improve the audio quality of 8-mm recording, it is optional also to record audio signals in a separate portion of each slant track shown in FIG. 2 by the cross-hatched sections identified as the audio portion 2A. These audio signals are recorded as pulse code modulated (PCM) audio signals in an angular extent of about 41° and may represent the same audio information as the FM audio signals recorded in video portion 2V (but with better quality). Thus, to record the slant tracks illustrated in FIG. 2, a PCM audio signal is recorded for about 41° and then the frequency-multiplexed combined video and audio signals are recorded in the remainder of the track (e.g. for about 180°). Even if the very same audio signals are recorded as both FM audio signals SM and SS and as PCM audio signals, the quality of the PCM audio signals is far superior. Nevertheless, the FM audio signals are recorded in portion 2V as part of the frequency-multiplexed combined signals in order to be compatible with typical 8-mm standards.

Typically, the PCM audio signals are produced by quantizing left and right channel audio channels into digital signals DD having 16 bits per sample at a sampling frequency of 48 kHz or 44.1 kHz or 32 kHz (each of which sampling frequencies has been adopted as a modification of the 8-mm recording standard). The digitized audio signals may be encoded in an error correcting code, such as a BCH code, or may have an error correcting code added thereto, such as a parity character, ECC code or the like. Then, the digitized audio signals are timebase compressed and converted in accordance with conventional recording code conversion techniques, such as 8-to-10 conversion. The resultant digitized, error-corrected, compressed and converted audio signals are recorded in audio portion 2A of each slant track.

The PCM audio signal recorded as aforementioned exhibits high quality and may be reproduced with characteristics equal to or better than the characteristics of audio signals reproduced by typical CD or R-DAT formats.

When reproducing digital signals, such as the PCM audio signals reproduced from the magnetic tape shown in FIG. 2, the use of equalizing circuitry is important to the elimination of intercode interference and to permit the demodulation of the left-channel and right-channel audio signals with minimal error rate. However, proper equalization generally is dependent upon an accurate prediction of the transmission characteristics exhibited by the signal transmission system formed of the record medium, the playback head, the conducting leads and the signal processing circuitry. Usually, these transmission characteristics vary from one playback device (or 8-mm recorder) to another. Since the transmission characteristics depend to a significant degree upon the particular magnetic tape that is used, the availability of a wide variety of tape practically assures different transmission characteristics each time a different tape is used. Thus, and with reference to FIG. 3, even if an equalizing circuit having an optimum equalization characteristic is selected, such as the characteristic indicated at point ②  for a particular tape, when other tapes are used the very same equalizing circuit may exhibit the relative equalization characteristic indicated at points ①, ③ or ④. Hence, although an optimum error rate may be obtained for this equalizing circuit when magnetic tape corresponding to point ② is used, poorer (i.e. higher) error rates may result when magnetic tapes corresponding to points ①, ③ or ④ are used.

The problem of matching equalization characteristics to transmission characteristics, and particularly to the type of tape and head which are used to reproduce digital signals may be overcome by using automatic equalizing circuits. However, such automatic equalizing circuits are complex and expensive and may contribute to a significantly higher overall cost of the 8-mm recorder.

Furthermore, the most favorable equalizing characteristics generally are obtained from an automatic equalizer circuit by executing a sequential equalizing process to arrive at the most favorable error rate. This sequential process is graphically depicted in FIG. 4 wherein different equalizing characteristics are selected in sequence, while sensing the error rate resulting from each selected characteristic. Once this sequence has been performed, the equalizing characteristic which resulted in the most favorable error rate is selected. However, this sequential process is time-consuming, and it may take several seconds until the most favorable equalizing characteristic is selected. Thus, there is a substantial and undesired time delay from the time a user first operates an 8-mm recorder to carry out a playback operation until satisfactory audio quality is obtained.

OBJECTS AND SUMMARY OF THE INVENTION

Therefore, it is an object of the present invention to provide improved playback apparatus which overcomes the aforenoted difficulties and drawbacks.

Another object of this invention is to provide digital signal reproducing apparatus which rapidly establishes equalizing characteristics that result in a digital signal having minimal error rate.

A further object of this invention is to provide digital signal reproducing apparatus wherein a digital signal is supplied over playback apparatus that may exhibit different transmission characteristics, and wherein processing circuitry having selectable characteristics is selected quickly to minimize the error rate of the reproduced signal notwithstanding such transmission characteristics.

An additional object of this invention is to provide apparatus for reproducing a digital signal from a record medium with playback elements that may have different transmission characteristics, and wherein one of plural processing circuits which exhibit respectively different characteristics (more or less matched to the different transmission characteristics) is selected in a manner which provides a processed signal having a most favorable error rate.

Still another object of this invention is to provide a technique for quickly and inexpensively equalizing a digital signal that may be reproduced by apparatus having generally unpredictable transmission characteristics.

Various other objects, advantages and features of the present invention will become readily apparent from the ensuing detailed description, and the novel features will be particularly pointed out in the appended claims.

In accordance with this invention, apparatus for reproducing a digital signal from a record medium includes plural processing circuits supplied with the digital signal played back from the record medium, each processing circuit exhibiting respectively different characteristics to impart different error rates to the digital signal processed thereby. The processed digital signal having the most favorable error rate is detected, and the particular processing circuit which produces that digital signal is selected.

As aspects of this invention, the processing circuits may comprise equalizing circuits, waveshaping circuits or synchronizing circuits, each exhibiting slightly different characteristics from the others, thus resulting in slightly different error rates, depending upon which processing circuit is selected.

Advantageously, the present invention is used to reproduced PCM audio signals from magnetic tape, such as PCM audio signals that are recorded in slant tracks along with video signals, as are recorded in the 8-mm recording format.

BRIEF DESCRIPTION OF THE DRAWINGS

The following detailed description, given by way of example, will best be understood in conjunction with the accompanying drawings in which:

FIGS. 5, 5A and 5B are a block diagram representing one embodiment of the present invention;

FIGS. 8, 8A and 8B comprise a block diagram of yet another embodiment of the present invention;

FIGS. 10, 10A and 10B comprise a block diagram representing a still further embodiment of the present invention;

FIGS. 11A-11E timing diagrams which re helpful in understanding the manner in which the embodiment of FIGS. 10A and 10B operates;

FIGS. 12, 12A and 12B illustrate a variation of the embodiment shown in FIGS. 5A and 5B;

FIGS. 13, 13A and 13B illustrate yet another variation of the embodiment shown in FIGS. 5A and 5B;

FIGS. 14, 14A and 14B comprise a block diagram representing a still further embodiment of the present invention.

DETAILED DESCRIPTION OF PREFERRED EMBODIMENTS

Figure 1:
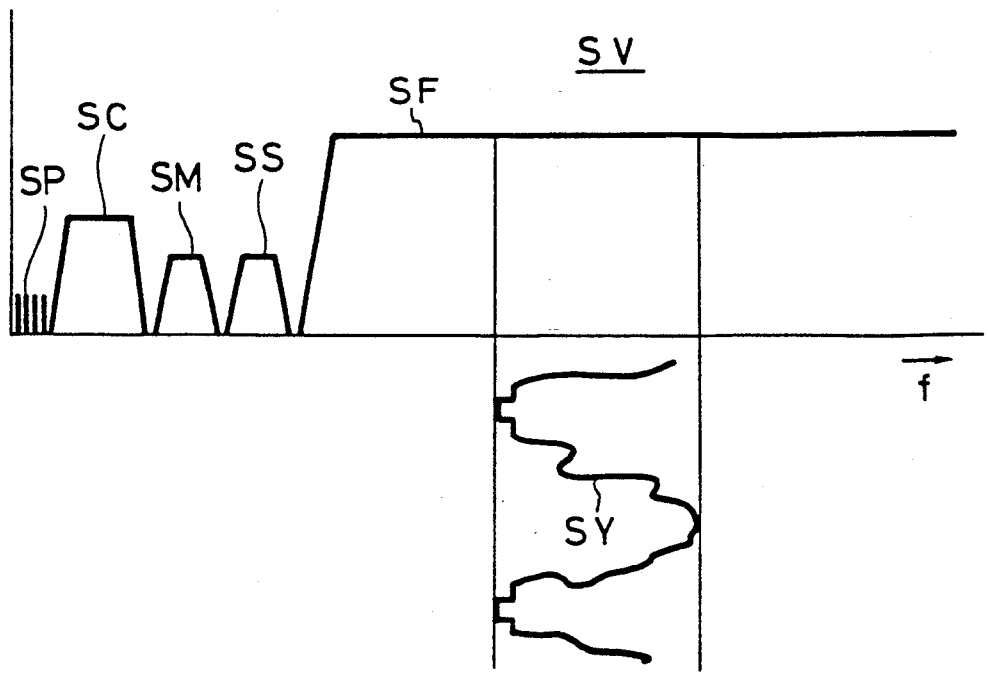
FIG. 1 is a graphical representation of the frequency spectrum normally used in 8-mm video recording.

Although the present invention has more general application to the reproduction of a digital signal from a record medium, to best appreciate this invention it is described in the environment of a video signal reproducing device, and in particular, to an 8-mm recorder which operates in a playback mode to reproduce the combined frequency multiplexed video and audio signals shown in FIG. 1 as well as the PCM audio signals recorded in lengths 2A of the record tracks.

Figure 2:
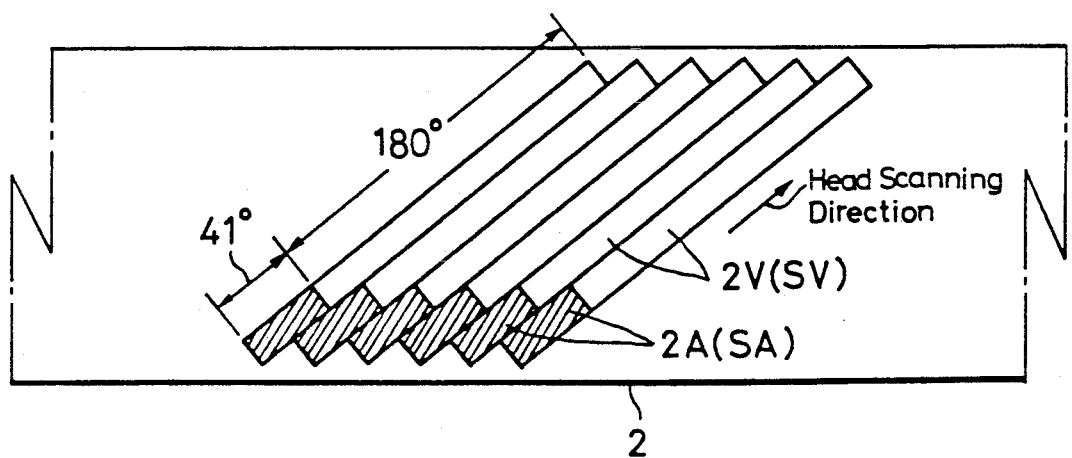
FIG. 2 is a schematic representation of slant tracks recorded in accordance with the 8-mm recording format.
Figure 5B:
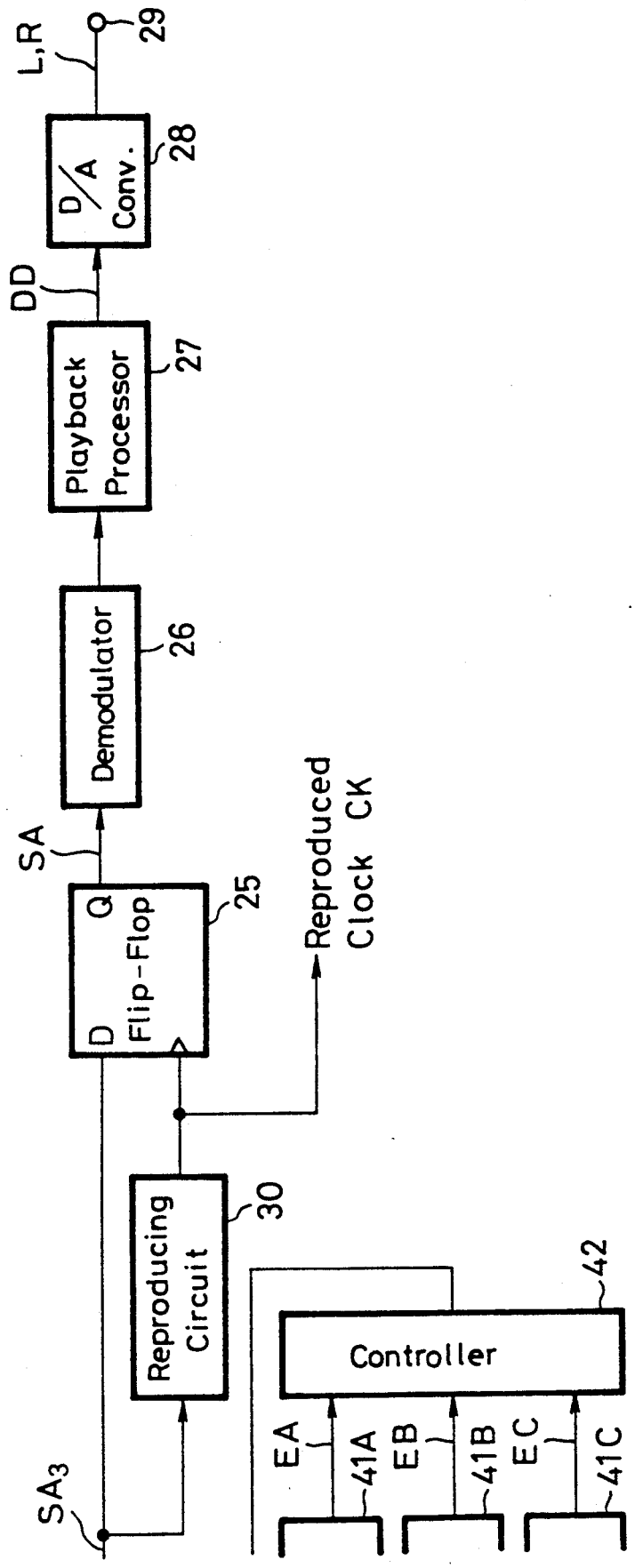

Referring now to the drawings, wherein like reference numerals are used throughout, FIGS. 5A and 5B comprise a block diagram of one embodiment of the present invention. A pair of diametrically opposed rotary magnetic heads 1A and 1B, preferably mounted on a rotary head drum about which magnetic tape 2 is deployed with a wrap angle on the order of about 221° and having successive, parallel slant tracks recorded thereon in the format shown in FIG. 2, is rotated to scan successive tracks and thereby recover a video field from each track. Assuming clockwise rotation of the heads, it is recognized that head 1A first scans portion 2A of a track to reproduce PCM audio signals therefrom and then scans portion 2B to reproduce the combined frequency multiplexed video, audio and pilot signals. As head 1A rotates toward the end of a track, head 1B comes into contact with the beginning of the adjacent track so as to reproduce PCM audio signals from portion 2A of that adjacent track. It is appreciated that heads 1A and 1B are in simultaneous contact with tape 2 for an angular extent of 41°, during which time one of the heads scans the video portion SV of one track while the other scans the audio portion SA of the next adjacent track.

Heads 1A and 1B are coupled to playback amplifiers 11A and 11B, respectively, and the combination of tape 2, heads 1A and 1B, conductor leads and amplifiers comprises a playback channel. The amplified reproduced video signals produced by these amplifiers are coupled to change-over switches 12 and 21 by which the signals reproduced by one or the other of these channels is supplied therethrough to further circuitry. Change-over switch 12 may be referred to as a video selector switch for coupling the frequency-multiplexed combined video, audio and pilot signals reproduced from video portion SV of a slant track to a video playback processor circuit 13 and to an audio playback processor circuit 15. With reference to FIG. 2, it is seen that when head 1A, for example, rotates into contact with the beginning of video portion SV of a track, video selector switch 12 couples the signal reproduced by head 1A from portion 2V to processor circuits 13 and 15. For convenience, the frequency-multiplexed combined video, audio and pilot signal reproduced from portion 2V of a slant track are referred to simply as the video signal. It will be appreciated that video selector switch 12 is changed over to couple to processor circuits 13 and 15 the video signal reproduced by head 1B from portion 2V of an adjacent track when head 1A reaches the end of the preceding track and head 1B reaches the beginning of the video portion in the succeeding track. Thus, the video selector switch operates to supply to the video and audio playback processor circuits the frequency-multiplexed combined video and audio signals that are reproduced from video portion 2V of each track.

Video playback processor circuit 13 forms no part of the present invention per se and may be of conventional construction to separate the frequency-multiplexed combined video signals from the FM audio signals and to derive from the FM luminance and frequency-converted chrominance components standard television signals suitable for display, such as NTSC video signals. Likewise, audio playback processor circuit 15 forms no part of the present invention per se and may be of conventional construction to recover from the frequency modulated sum and difference stereophonic audio signals the left-channel and right-channel signals suitable for sound reproduction.

Video playback processor circuit 13 is provided with an output terminal 14 to which the recovered color composite video signal is supplied. This output video signal may be further processed, displayed or otherwise utilized by additional circuitry connected to output terminal 14. Similarly, audio playback processor circuit 15 includes an output terminal, or terminals 16 to which the recovered left-channel and right-channel audio signals L, R are supplied. Additional circuitry or sound recovery apparatus may be coupled to output terminal 16 for further processing or transducing of the audio signals.

Change-over switch 21 is referred to as an audio selector switch and is operable to select a PCM audio signal reproduced from tape 2 by head 1A or head 1B. From FIG. 2, it is seen that when one head scans audio portion 2A of a track, the other head is in the process of scanning the video portion of the preceding track. Thus, it is a relatively simple matter to operate audio selector switch 21 to couple PCM audio signals alternately from head 1A and then from head 1B as the heads rotate.

Figure 3:
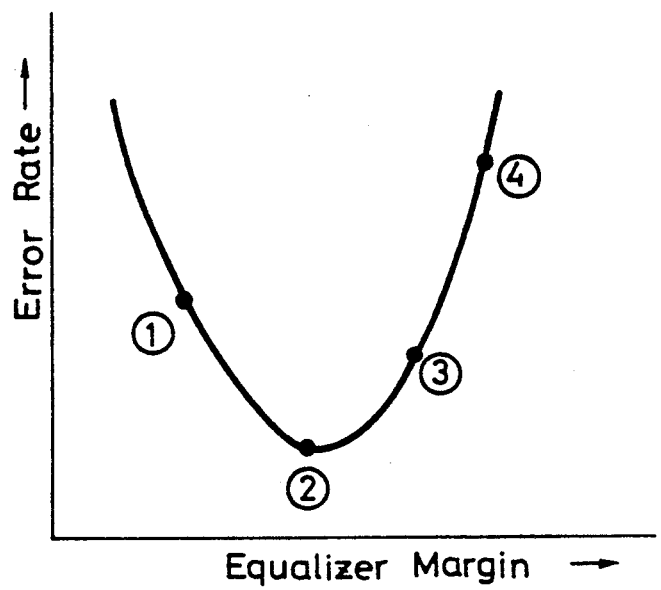
FIG. 3 is a graphical representation of the relationship between equalizing characteristics and error rate for a particular playback arrangement.

The output of audio selector switch 21 is coupled in common to a plurality of digital signal processing circuits, here illustrated as three equalizer circuits 22A, 22B and 22C. The equalizer circuits may be typical playback equalizers adapted to equalize the digital signals (i.e. the PCM audio signals) supplied thereto from head 1A or head 1B. Here, however, the equalizer circuits are not of identical configuration. Rather, the operating characteristics, such as the transfer characteristics thereof, are deliberately varied from one equalizer circuit to the other. For example, and with reference to the graphical depiction shown in FIG. 3, for a given magnetic tape and head, playback equalizer circuit 22A may exhibit an equalization function corresponding to that shown as point ①, for another tape and head combination equalizer circuit 22B may exhibit an equalization function corresponding to point ② and for a still further tape and head combination equalizer circuit 22C may exhibit the equalization function corresponding to point ③. Thus, it is expected that, for a given combination of tape, head and conductor leads, one of the equalizer circuits will provide optimum (or at least most favorable) equalization to the digital signal reproduced from the head.

Figure 6:
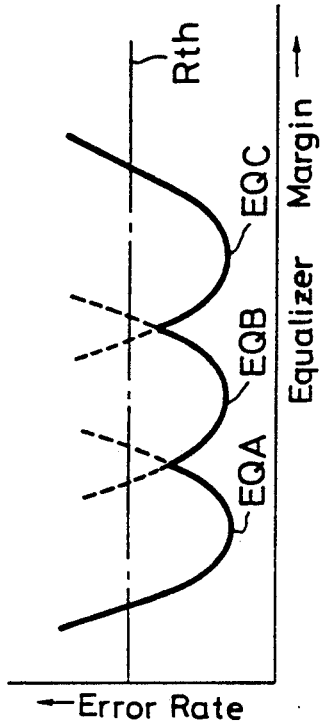
FIG. 6 is a graphical representation of the equalizing characteristics exhibited by the arrangement shown in FIGS. 5A and 5B.

FIG. 6 is a graphical representation of the equalizer characteristics exhibited by the respective equalizer circuits. In the illustrated example, equalizer circuit 22A exhibits equalizer characteristic EQA, equalizer circuit 22B exhibits equalizer characteristic EQB and equalizer circuit 22C exhibits equalizer characteristic EQC. FIG. 6 also depicts the error rate as a function of each equalizer characteristic. Hence, for a given combination of tape and head, that is, for a given transmission function in the digital signal playback channel, each equalizer circuit imparts a different error rate to the digital signal which is equalized thereby.

If a threshold (or maximum acceptable error rate) is represented as the threshold level Rth, it is seen that the equalizer characteristic curves EQA and EQB as well as the equalizer characteristic curves EQB and EQC intersect each other at an error rate level below this threshold level.

The equalized digital signals produced by equalizer circuits 22A, 22B and 22C are supplied to waveform shaping circuits 23A, 23B and 23C, respectively, as equalized digital signals $SA_1$. The waveform shaping circuits, which also are included in the digital signal processing circuitry, operate as pulse detectors and sense whether the equalized digital signal exceeds or is less than a threshold level so as to produce a "1" or "0", respectively. It will be appreciated that, depending upon the equalizer characteristics exhibited by the respective equalizer circuits and, thus, the respective error rates imparted by these equalizer circuits to the reproduced digital signal, one waveform shaping circuit may produce a "1" while the others produce a "0". That is, the waveform of the equalized digital signal may be somewhat degraded as a function of the particular equalizer characteristics exhibited by the equalizer circuits.

The waveshaped signal $SA_{2A}$, $SA_{2B}$ and $SA_{2C}$ produced by waveform shaping circuits 23A, 23B and 23C are coupled to terminals A, B and C, respectively, of a selector switch 24. The selector switch is controlled in a manner described below such that the waveshaped digital signal having the most favorable error rate is selected and coupled as the digital signal $SA_3$ to further circuitry. This further circuitry functions to demodulate the digital signal and, in the embodiment wherein the digital signal comprises a PCM audio signal, the audio information is recovered and converted to analog form. Such demodulating circuitry is illustrated in FIG. 5B a included a D-type flip-flop circuit 25, a demodulator 26, a playback processor 27 and a digital-to-analog (D/A) converter 28. The digital signal $SA_3$ selected by switch 24 is supplied to the data input (i.e. the D input) of flip-flop circuit 25 and also is coupled to a clock reproducing circuit 30. The clock reproducing circuit is conventional and functions to recover timing information included in the digital signal. As a result, a clock signal recovered from the reproduced digital signal is produced and this recovered clock signal is applied to the clock input of the flip-flop circuit. Consequently, the Q output of flip-flop circuit 25 produces a synchronized, or timed digital signal $SA_4$.

Demodulator 26 receives the synchronized digital signal $SA_4$ and performs a 10-to-8 conversion or other conversion which is complementary to the conversion used to record the digital signal. Demodulator 26 thus supplies a demodulated PCM audio signal to playback processor 27 which performs an error correction function to correct errors that may be introduced into the PCM audio signal during the recording and/or reproducing operations. The playback processor also expands the timebase of the error-corrected PCM audio signal so as to compensate for the timebase compression that was carried out during recording. Hence, the original digital signal DD, that is, the original PCM audio signal, is recovered. This PCM audio signal is converted to analog form by D/A converter 28; and the resultant left-channel and right-channel audio signals are provided at an output terminal (or terminals) 29 for further use.

The apparatus used to control switch 24 to select the equalized, waveshaped digital signal having the most favorable error rate (for example, the digital signal exhibiting the lowest error rate) now will be described. Syndrome generators 41A, 41B and 41C are coupled to waveform shaping circuits 23A, 23B and 23C to receive waveshaped digital signals $SA_{2A}$, $SA_{2B}$ and $SA_{2C}$, respectively. As is known to those of ordinary skill in the art, a syndrome generator may be of the type described in *Information Theory and Reliable Communication*, Robert G. Gallager, John Wiley & Sons, Inc., pages 200-201 and 238-259, or in *Error-Correcting Codes*, by Peterson and Welden, MIT Press (1981), pages 283-307. Stated briefly, each syndrome generator detects errors that may be present in the digital signals supplied thereto, these errors being detected as a function of the error correcting codes which may be used to encode the digital signal, the parity codes used with the digital signal or with the error correction codes that may be added during recording for error detection/correction purposes. A particular example of a syndrome generator which may be used is shown in FIG. 6.7.5 at page 255 of the Gallager text. In a simplified form, the syndrome generator produces a binary "0" output signal when no error is detected and produces an error flag when an error in the supplied digital signal is sensed. Alternatively, the syndrome generator may produce a digital output signal having a value corresponding to the number of errors which are detected. Error indicating signals EA, EB and EC are produced by syndrome generators 41A, 41B and 41C, respectively, and these error indicating signals are supplied to controller 42 which senses the error signal having the smallest value. Depending upon which error indicating signal exhibits the lowest value, controller 42 operates switch 24 to select the equalized, waveshaped digital signal which has that error rate.

In the environment wherein the digital signal SA is a PCM audio signal, audio portion 2A on each track may be comprised of, for example, 110 data blocks. Each block is comprised of an error correcting code and, if desired, a parity code such that an error that may be present in an individual block is readily detected. Syndrome generators 41A-41C function to sense whether an error is present in a respective block of the digital signals $SA_{2A}$, $SA_{2B}$ and $SA_{2C}$ supplied thereto. That is, the syndrome generators operate on a block-by-block basis. Whichever block exhibits the least error rate, as sensed by the syndrome generators, controller 42 sets switch 24 to select that block as the digital signal $SA_3$ to be demodulated. When operating on a block-by-block basis, the syndrome generator simply may produce an error flag when an error is detected; and controller 42 may change the setting of switch 24 if the present setting thereof is coupled to a data block which produces an error flag and another data block is present which does not.

As an alternative mode of operation, each syndrome generator may operate on a block-by-block basis, thus producing an error indication (either "0" or "1") for each block. Controller 42 counts the number of error indications produced by each syndrome generator when the PCM audio signal is reproduced from audio portion 2A of a track. In addition to being supplied to the respective syndrome generators on a block-by-block basis, each block may be stored, and controller 42 reads out all of the stored blocks produced by the playback equalizer and waveform shaping circuits which exhibit the least number of error indications. For example, if all of the blocks recovered from audio portion 2A by playback equalizer circuit 22B and waveform shaping circuit 23B have the least number of errors indicated by syndrome generator 41B, controller 42 operates switch 24 to read out from a memory the stored blocks produced by equalizer circuit 22B and waveform shaping circuit 23B. Alternatively, if the number of errors indicated by syndrome generator 41A for the PCM audio signal reproduced from audio portion 2A is the least, controller 42 operates switch 24 to read out from a memory the data blocks processed by equalizer circuit 22A and waveform shaping circuit 23A.

Thus, it is appreciated that if playback equalizer circuits 22A, 22B and 22C exhibit different equalizing characteristics, it is expected that different error rates will be imparted thereby to the digital signals $SA_{1A}$, $SA_{1B}$ and $SA_C$; and these error rates are sensed by syndrome generators 41A, 41B and 41C to produce error indications EA, EB and EC, respectively. Controller 42 determines which of these error indications is the most favorable (i.e. which error rate is the least), and operates switch 24 to select the processed digital signal $SA_{2A}$, $SA_{2B}$, $SA_{2C}$ having the most favorable error rate. As mentioned above, the determination by controller 42 as to which processed digital exhibits the most favorable error rate may be carried out on a block-by-block basis, with the setting of switch 24 being changed at each block, or may be carried out after all of the digital signals recorded in audio portion 2A of a slant track have been reproduced, in which case controller 42 may change the setting of switch 24 as each track is scanned. Of course, if an error rate detection is carried out only after all of the data blocks in an audio portion 2A of a track have been reproduced, the data blocks processed by each processing channel should be stored and then read out after all of those data blocks have been recovered from the track.

Figure 7:
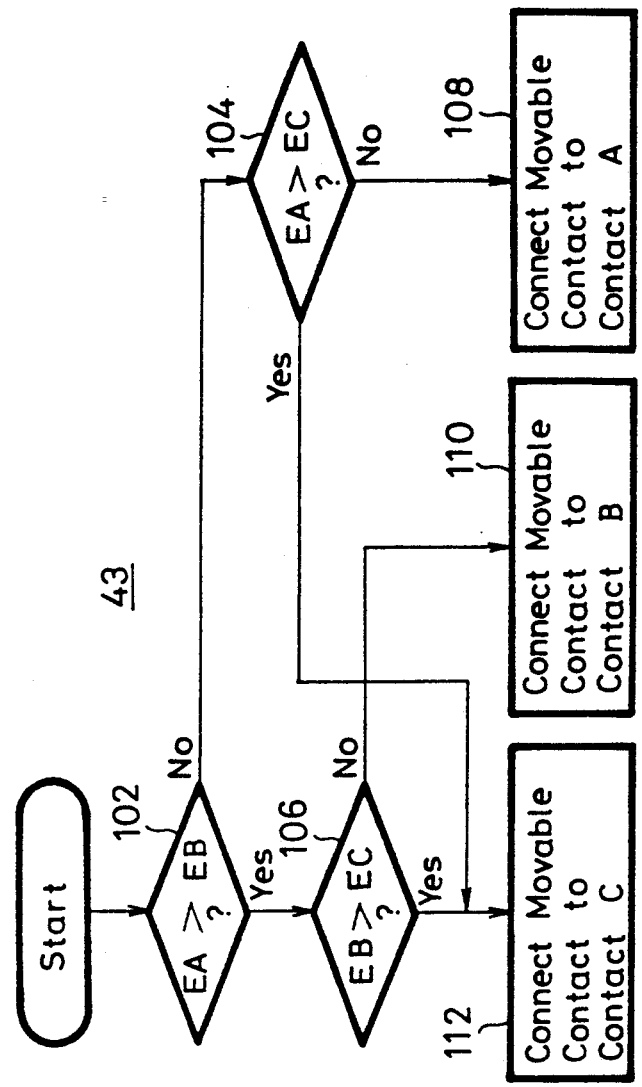
FIG. 7 is a flow chart which represents the manner in which the controller used in the embodiment of FIGS. 5A and 5B to detect the most favored error rate.

The manner in which controller 42 operates now will be described in conjunction with the flow chart illustrated in FIG. 7. As will be appreciated, the controller may include a processor for sensing the most favorable error rate detected by syndrome generators 41A, 41B and 41C and for coupling switch 24 to the one input terminal A, B or C to which digital signals having the most favorable error rate are applied. Initially, controller 42 compares the error indication EA produced by syndrome generator 41A to error indication EB produced by syndrome generator 41B. Inquiry 102 determines if EA>EB and, if not, a comparison between the error indication EA produced by syndrome generator 41A to the error indication EC produced by syndrome generator 41C is made. Inquiry 104 determines if EA>EC. If this inquiry is answered in the negative, it is concluded that the value of error indication EA is the lowest and processed digital signal $SA_{2A}$ exhibits the lowest error rate. Consequently, controller 42 advances to instruction 108 which operates switch 24 to select input terminal A and thereby couple processed digital signal $SA_{2A}$ to the demodulator.

Returning to inquiry 102 and assuming once again that EA is not greater than EB, the controller once again advances to inquiry 104. Now, if EA>EC, inquiry 104 is answered in the affirmative, concluding that error indication EC is of the lowest value. Hence, controller 42 advances to instruction 112 which sets switch 24 to input terminal C to select the processed digital signal $SA_{2C}$ (which has been detected as having the most favorable error rate) for demodulation.

Assuming that EA>EB, inquiry 102 is answered in the affirmative; and controller 42 advances to inquiry 106. If error indication EB is not greater than error indication EC, inquiry 106 is answered in the negative and controller 42 advances to instruction 110 which sets switch 24 to input terminal B. Thus, processed digital signal $SA_{2B}$, which is sensed as having the most favorable error rate, is coupled to the demodulating circuitry.

In the embodiment shown in FIGS. 5A and 5B, different equalizer characteristics are provided for the purpose of matching differing transmission characteristics in a playback channel, as may be attributed to various tape-head combinations as well as the conducting leads used to couple the reproduced digital signals to the equalizers. FIG. 6 graphically illustrates the wide equalizer margin provided by equalizer circuits 22A–22C. Nevertheless, it is expected that, for a given head-tape-conductor combination, the error rate imparted to one of the digital signals processed by equalizer circuits 22A, 22B and 22C will be the lowest. The combination of the syndrome generators and controller functions to detect which of the processed digital signals has the lowest error rate; and switch 24 is controlled to select that processed digital signal for demodulation.

Figure 4:
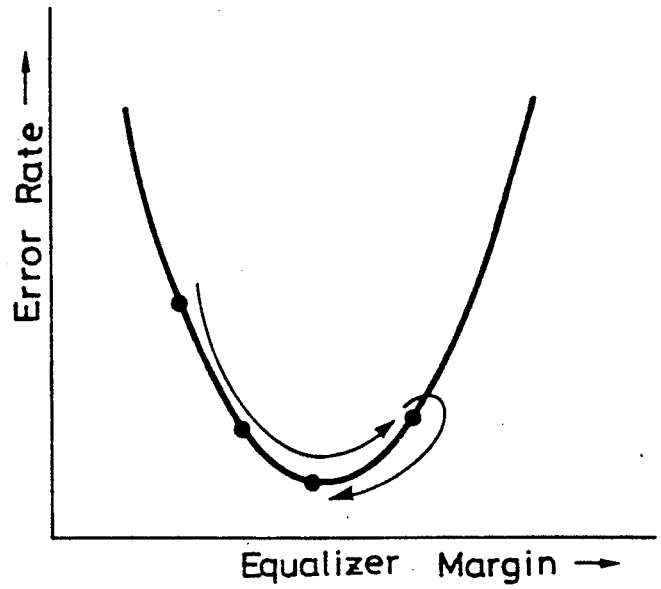
FIG. 4 is a graphical representation of the sequential process used to select an automatic equalizing characteristic for a digital signal playback arrangement whose transmission characteristics are not predictable.

It will be appreciated that controller 42 may be relatively simple and, thus, inexpensive. It is expected that the cost of implementing the embodiment shown in FIG. 5A is less than the cost of constructing a suitable automatic equalizer. Furthermore, and advantageously, the time needed to select the processed digital signal having the most favorable error rate is substantially less than the time needed for an automatic equalizer to undergo the sequential processing graphically depicted in FIG. 4. Hence, the selection of an equalizer having the most favorable equalizing characteristics can be done almost immediately after a user first operates an 8-mm recorder to carry out a playback operation.

Figure 8A:
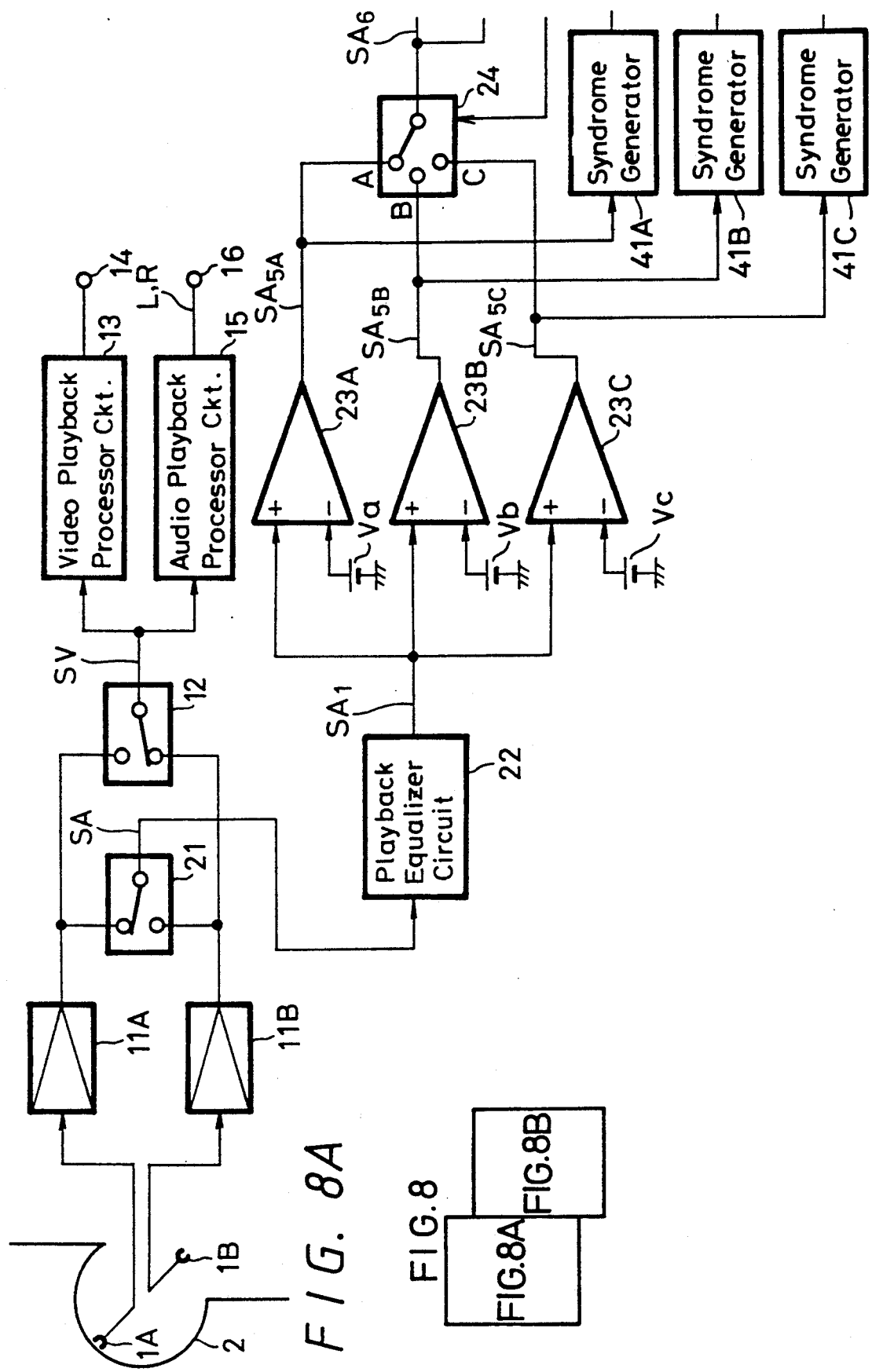
Figure 8B:
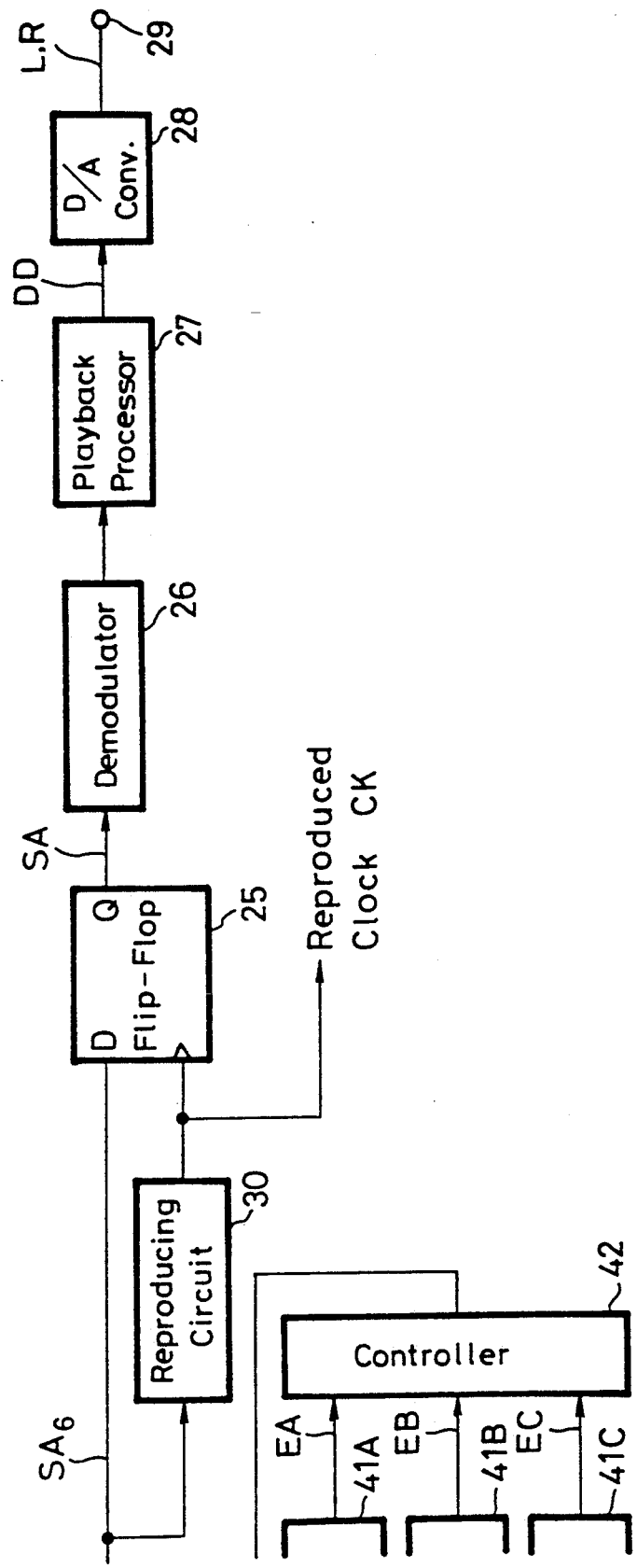

Another embodiment for implementing the present invention is illustrated in the block diagram of FIGS. 8A and 8B. A comparison of the embodiment shown in FIGS. 8A and 8B with the aforedescribed embodiment shown in FIGS. 5A and 5B indicates a difference in the processing circuitry that is used to process the digital signal SA recovered from magnetic tape 2. In the FIG. 8 embodiment, a single playback equalizer circuit 22 is used, and this single equalizer is coupled to waveform shaping circuits 23A, 23B and 23C illustrated as level comparators supplied with respective reference levels Va, Vb and Vc. Assuming that Va>Vb>Vc, it is expected that the equalized digital signal $SA_1$ produced by equalizer circuit 22 will cross reference level Vc before it crosses reference level Vb which, in turn, will be crossed before reference level Va. Hence, depending upon the particular waveform produced by equalizer circuit 22, which is a function of the aforementioned tape-head-conductor characteristics of the playback channel, one of the level comparators will produce a digital signal having a more favorable error rate than the others.

As before, syndrome generators 41A–41C detect errors in the processed digital signals $SA_{5A}$, $SA_{5B}$ and $SA_{5C}$ produced by waveform shaping circuits 23A, 23B and 23C, respectively, and controller 42 senses the most favorable error rate of these processed digital signals.

Switch 24 then is set to select for demodulation the processed digital signal having the most favorable error rate.

Figures 9A, 9B, 9C, 9D:
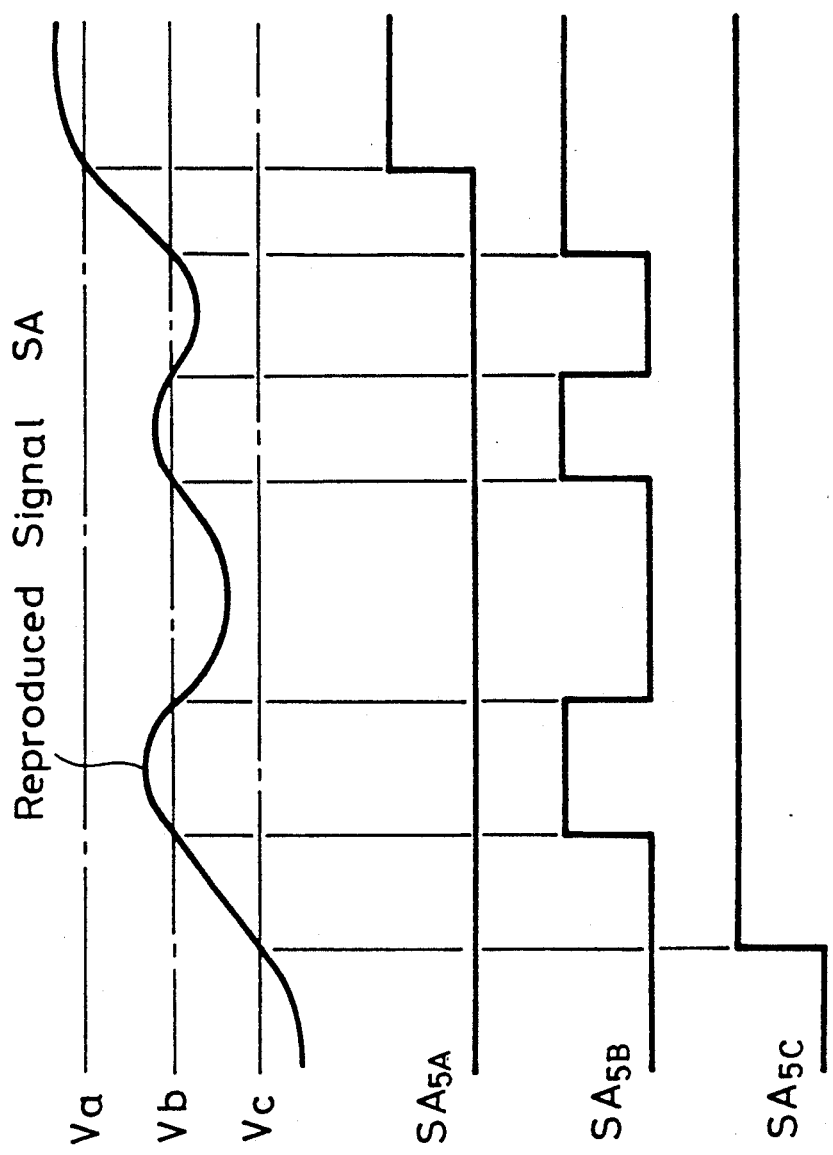
FIGS. 9A-9D are waveform diagrams which are useful in understanding the manner in which the embodiment shown in FIGS. 8A and 8B operates.

The different error rates imparted to digital signal $SA_1$ by waveform shaping circuits 23A–23C having different reference levels will best be appreciated by referring to the waveforms shown in FIGS. 9A–9D. Let it be assumed that the transfer characteristic of the tape-head-equalizer combination results in an equalized, reproduced digital signal $SA_1$ having the waveform shown in FIG. 9A. For convenience, the respective reference levels Va–Vc are superimposed onto this waveform. FIG. 9B illustrates the waveshaped digital signal $SA_{5A}$ produced when digital signal $SA_1$ exceeds reference level Va. FIG. 9C illustrates the waveshaped digital signal $SA_{5B}$ produced when waveform $SA_1$ exceeds reference level Vb. Likewise, FIG. 9D illustrates waveshaped digital signal $SA_{5C}$ produced when waveform $SA_1$ exceeds reference level Vc. Syndrome generator 41A detects errors in waveshaped digital signal $SA_{5A}$, syndrome generator 41B detects errors in waveshaped digital signal $SA_{5B}$ and syndrome generator 41C detects errors in waveshaped digital $SA_{5C}$. Based upon the aforementioned description of the syndrome generators, it is appreciated that, in the example discussed herein, syndrome generator 41B produces an error indication having the most favorable error rate. Consequently, controller 42 operates switch 24 to couple input terminal B to the demodulating circuitry, whereupon the waveshaped digital signal $SA_{5B}$ shown in FIG. 9C, having the most favorable error rate, is demodulated.

Figure 10B:
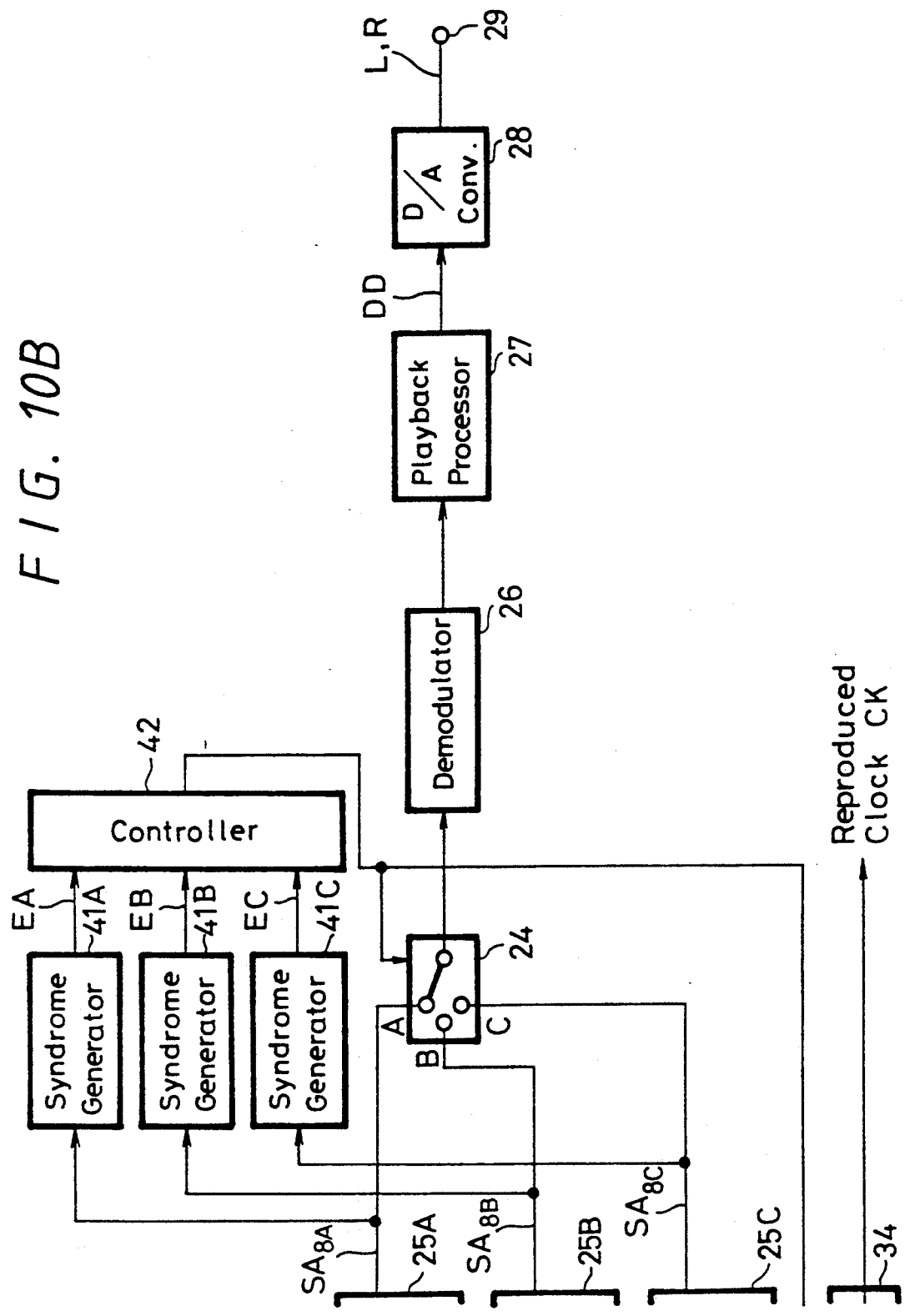

Yet another embodiment of the present invention is illustrated in FIGS. 10A and 10B. The processing circuitry that is used to process the reproduced digital signal SA in this embodiment is modified relative to that of FIGS. 5A and 5B. As before, the reproduced digital signal is equalized and waveshaped; but in the present embodiment, a single equalizer circuit 22 and a single waveform shaping circuit 23 are used to produce equalized, shaped digital signal $SA_2$.

The equalized, shaped digital signal $SA_2$ is coupled to a synchronizing circuit for synchronizing the reproduced digital signal with clock signals of respectively different phases. As discussed above, the synchronizing circuit shown in the embodiment of FIG. 5 is comprised of a D-type flip-flop circuit 25 and a clock recovery circuit 30. In the FIG. 10A embodiment, a similar synchronizing circuit is provided, wherein plural D-type flip-flop circuits 25A, 25B and 25C have their D inputs connected in common to receive the reproduced digital signal $SA_2$. A clock reproducing circuit 30, which may include a phase locked loop, also receives the reproduced digital signal $SA_2$ and operates to recover a clock signal CKA therefrom. It is appreciated that the recording format used to record the digital signal may be such that the recorded digital signal is a self-clocking signal; and this self-clocking feature is conventional and used by reproducing circuit 30 to recover the clock signal CKA.

Clock signal CKA is coupled to the timing input of D-type flip-flop circuit 25A and also is supplied through a delay, or phase shift circuit 31B to the timing input of flip-flop circuit 25B as clock signal CKB. This clock signal CKB also is coupled through a delay or phase shift circuit 31C to the timing input of flip-flop circuit 25C as the clock signal CKC. By reason of the delay circuits, clock signals CKA, CKB and CKC exhibit a relative time shift with respect to each other, for example, a shift on the order of 120°. As a consequence, the reproduced digital signal $SA_2$ is synchronized with successively shifted clock signals CKA, CKB and CKC by flip-flop circuits 25A, 25B and 25C, respectively. Therefore, a relatively narrow pulse included in reproduced digital signal $SA_2$ may be synchronized with one clock signal, such as clock signal CKA, to produce a synchronized "1", but another clock signal, such as clock signal CKC, may occur after this narrow pulse terminates such that another flip-flop circuit, such as flip-flop circuit 25C, produces a "0".

The synchronized digital signals $SA_{8A}$, $SA_{8B}$ and $SA_{8C}$ produced by flip-flop circuits 25A, 25B and 25C, respectively, are supplied to syndrome generators 41A, 41B and 41C, respectively, for the detection of errors therein. As before, controller 42 senses the most favorable error rate in response to error indications EA, EB and EC produced by these syndrome generators so as to set switch 24 to the input terminal to which the synchronized digital signal having the most favorable error rate is applied.

The clock signals CKA, CKB and CKC which are time (or phase) shifted with respect to each other also are supplied to input terminals A, B and C, respectively, of a clock selector switch 34. This clock selector switch is controlled by controller 42 to select the particular clock signal that is used to synchronize the reproduced digital signal having the most favorable error rate. Thus, the clock signal to which the reproduced digital signal is synchronized is recovered and may be used by other circuitry (not shown).

To best appreciate the operation of the processing circuitry used to synchronize the reproduced digital signal, reference is made to the waveforms shown in FIGS. 11A–11E. Let it be assumed that the reproduced, equalized digital signal is as shown in FIG. 11A. When this equalized digital signal exceeds a reference level, also shown in FIG. 11A, a "1" is produced. The resultant waveshaped digital signal $SA_2$ is illustrated in FIG. 11B.

FIG. 11C illustrates the reproduced clock signal CKA recovered from digital signal $SA_2$ by reproducing circuit 30. Delay circuit 31B delays clock signal CKA by a predetermined amount to produce the clock signal CKB illustrated in FIG. 11D. Likewise, delay circuit 31C delays clock signal CKB by a similar predetermined amount to produce the clock signal CKC shown in FIG. 11E. Now, assuming that each D-type flip-flop circuit responds to the positive transition of the clock signals supplied thereto, it is seen that flip-flop circuit 25A responds to the positive transitions of clock signal CKA to produce the following output signal $SA_{8A}$: transition $tA_1$ produces a "1", transition $tA_2$ produces a "0", transition $tA_3$ produces a "1" and transition $tA_4$ produces a "0".

Similarly, flip-flop circuit 25B responds to the positive transitions of clock signal CKB to produce the following digital signal $SA_{8B}$: transition $tB_1$ produces a "1", transition $tB_2$ produces a "0", transition $tB_3$ produces a "1" and transition $tB_4$ produces a "1".

In a similar fashion, flip-flop circuit 25C responds to the positive transitions of clock signal CKC to produce digital signal $SA_{8C}$ as follows: transition $tC_1$ produces a "0"; transition $tC_2$ produces a "0", transition $tC_3$ produces a "0" and transition $tC_4$ produces a "1".

From the foregoing, it is appreciated that the synchronized digital signal $SA_{8A}$ accurately reproduces, in timed relationship, the equalized, waveshaped digital signal $SA_2$. However, the synchronized digital signals $SA_{8B}$ and $SA_{8C}$ exhibit errors therein due to the phase shift of the clock signals supplied to flip-flop circuits 25B and 25C. Syndrome generator 41A produces an error indication EA whose value is less than error indications EB and EC produced by syndrome generators 41B and 41C. Thus, controller 42 sets switch 24 to couple input terminal A to the demodulating circuitry, thereby supplying the synchronized digital signal $SA_{8A}$ from flip-flop circuit 25A to demodulator 26. That is, the synchronized digital signal having the most favorable error rate is selected for demodulation.

Since the synchronized digital signal which is selected for demodulation is synchronized to clock signal CKA, controller 42 sets clock selector switch 34 to its input terminal A to couple the clock signals CKA (to which the synchronized digital signal is synchronized) to further circuitry for use as may be needed.

Figures 12, 12A:
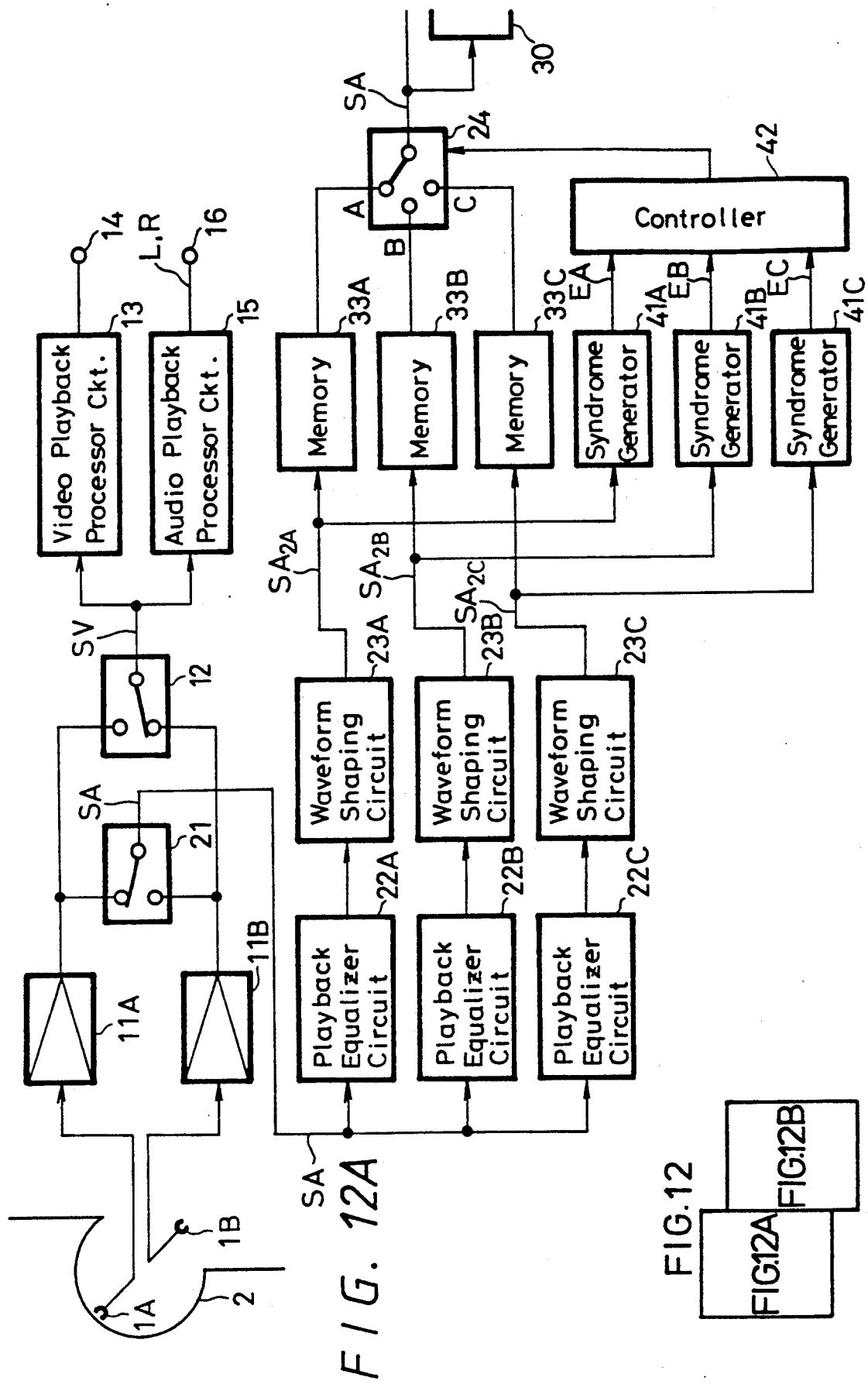

Referring to FIGS. 12A and 12B, there is illustrated a modification of the embodiment shown in FIGS. 5A and 5B in which the equalized, waveshaped digital signals $SA_{2A}$, $SA_{2B}$ and $SA_{2C}$ are supplied to input terminals A, B and C of selector switch 24 by way of memory devices 33A, 33B and 33C, respectively. These memory devices may be the memories discussed hereinabove in conjunction with the FIG. 5 embodiment, wherein blocks of PCM audio signals included in, for example, audio portion 2A of a track are stored until controller 42 determines which of these stored digital signals exhibits the most favorable error rate. Alternatively, if controller 42 operates switch 24 on a block-by-block basis, as discussed previously, then memory devices 33A, 33B and 33C function to store a block of the equalized, waveshaped digital signals $SA_{2A}$, $SA_{2B}$ and $SA_{2C}$, respectively, until controller 42 determines which of these blocks exhibits the most favorable error rate. Although not shown, it will be appreciated that the block or blocks stored in a memory device is read therefrom in synchronism with the output signal produced by controller 42. Indeed, switch 24 may be implemented by supplying a read enable signal from the controller to the particular memory device in which is stored the block (or blocks) having the most favorable error rate.

Figure 13A:
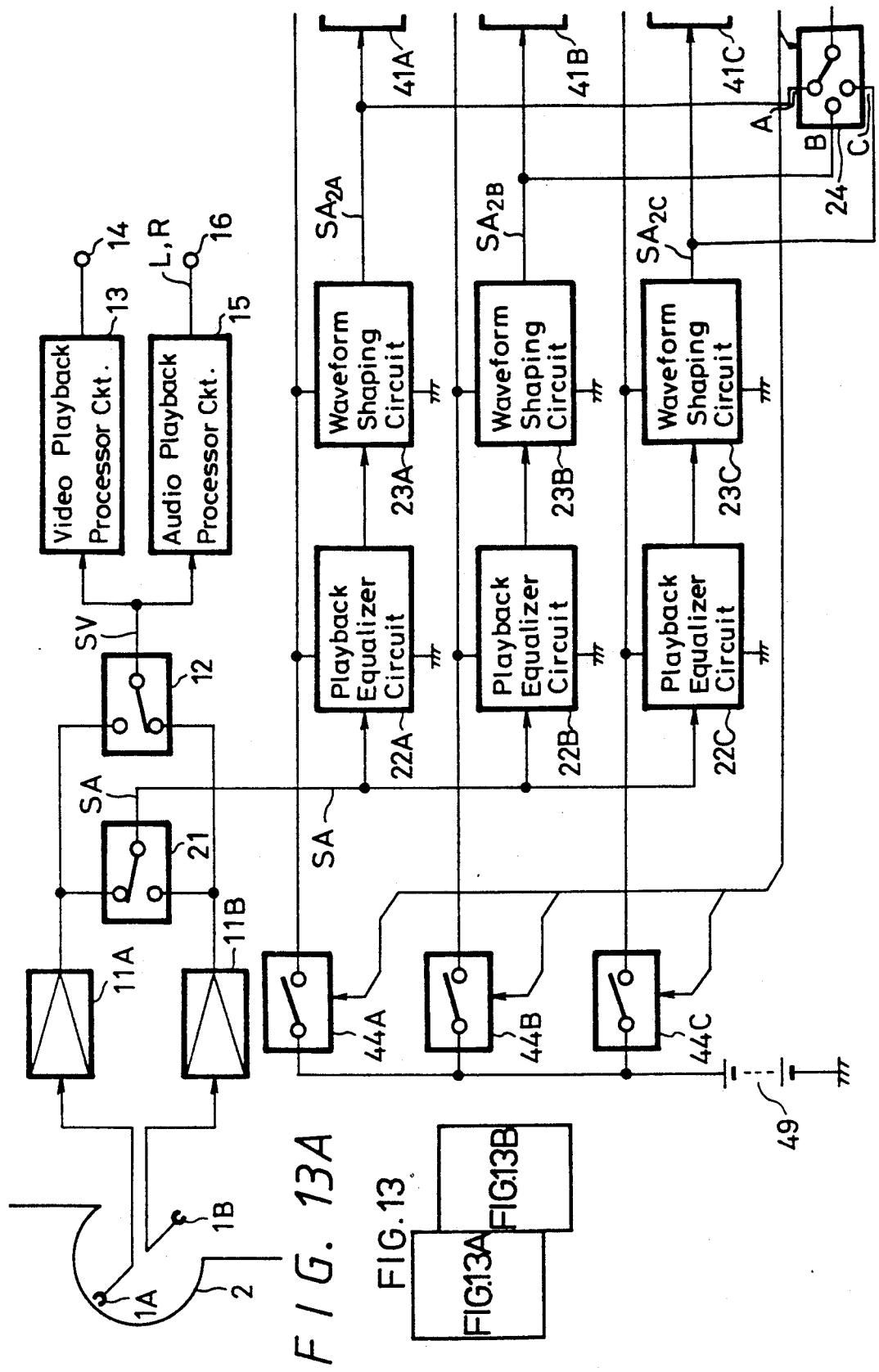
Figure 13B:
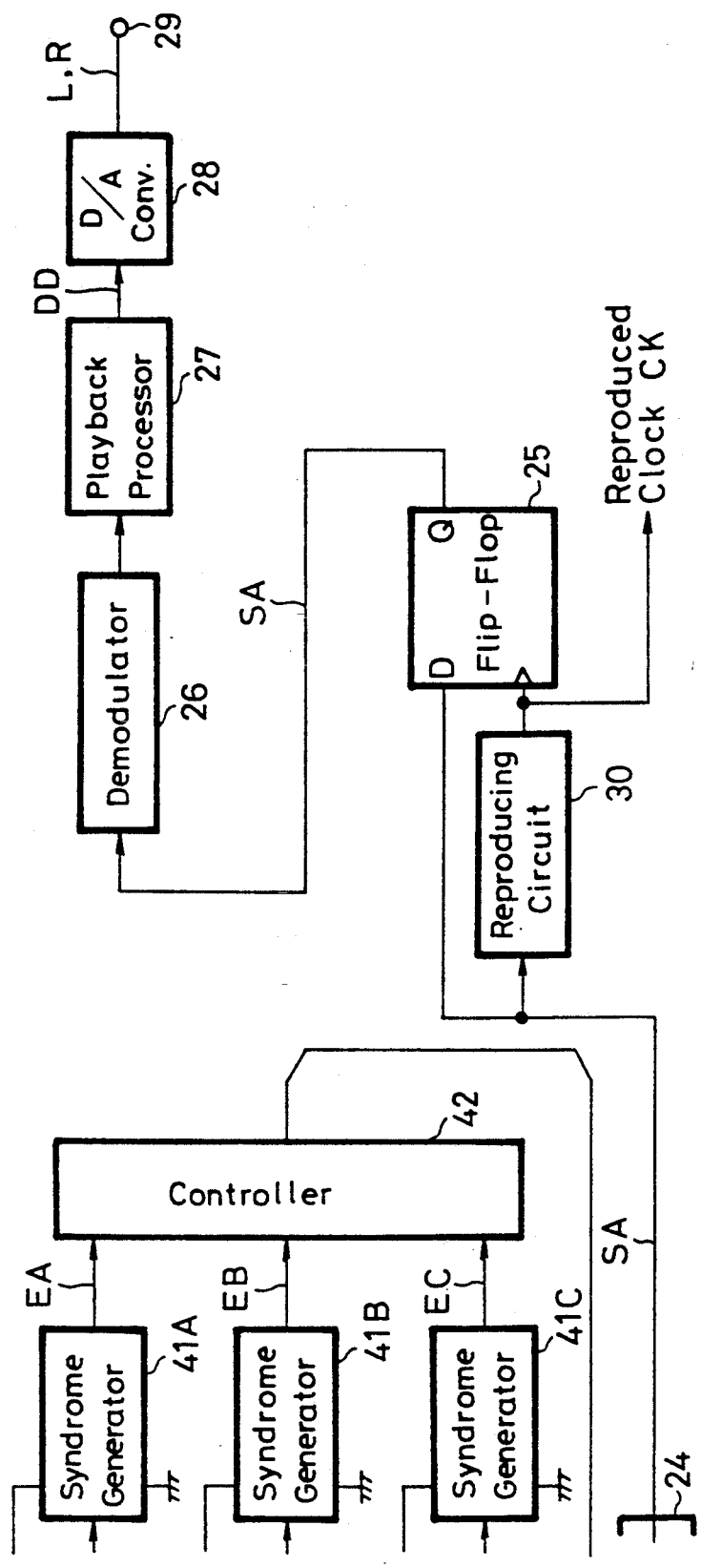

A still further embodiment of the present invention is illustrated in FIGS. 13A and 13B. This embodiment is seen to be quite similar to that shown in FIG. 5, with the following additional feature: the energizing power supplied to each processing circuit (e.g. to the cascaded equalizer and waveshaping circuits) is selectively interrupted by a switch controlled by controller 42. In particular, a suitable power supply, schematically represented as power supply 49, is coupled by way of switch 44A to playback equalizer circuit 22A and waveform shaping circuit 23A. Switch 44A also couples energizing power to syndrome generator 41A. Similarly, switch 44B couples power supply 49 to equalizer circuit 22B, waveform shaping circuit 23B and syndrome generator 41B. In similar fashion, switch 44C couples power supply 49 to equalizer circuit 22C, waveform shaping circuit 23C and syndrome generator 41C. The purpose of switches 44A-44C is to minimize power consumption by those processing circuits which are not selected for processing the reproduced digital signal because they do not exhibit the most favorable error rate.

In operation, controller 42 periodically closes all of switches 44A, 44B and 44C for a predetermined duration sufficient for the equalizer circuits, waveform shaping circuits and syndrome generators to operate and supply error indications EA, EB and EC to the controller. Once the controller determines which of the processing circuits produces an equalized, waveshaped digital signal $SA_2$ of lowest error rate, the switch which couples energizing power to that processing circuit is maintained closed and the other two switches are opened. Thus, only the processing circuit which produces the digital signal $SA_2$ with the most favorable error rate is energized. The remaining processing circuits whose output digital signals are not supplied to the demodulating circuitry are deenergized, thereby conserving power.

The foregoing operation is repeated periodically by controller 42 so as to update the determination and selection of the processed digital signal having the most favorable error rate.

It will be appreciated that the use of power supply switches 44A-44C may be used in the embodiments discussed hereinabove with respect to FIGS. 8, 10 and 12, if desired.

Figures 14, 14A:
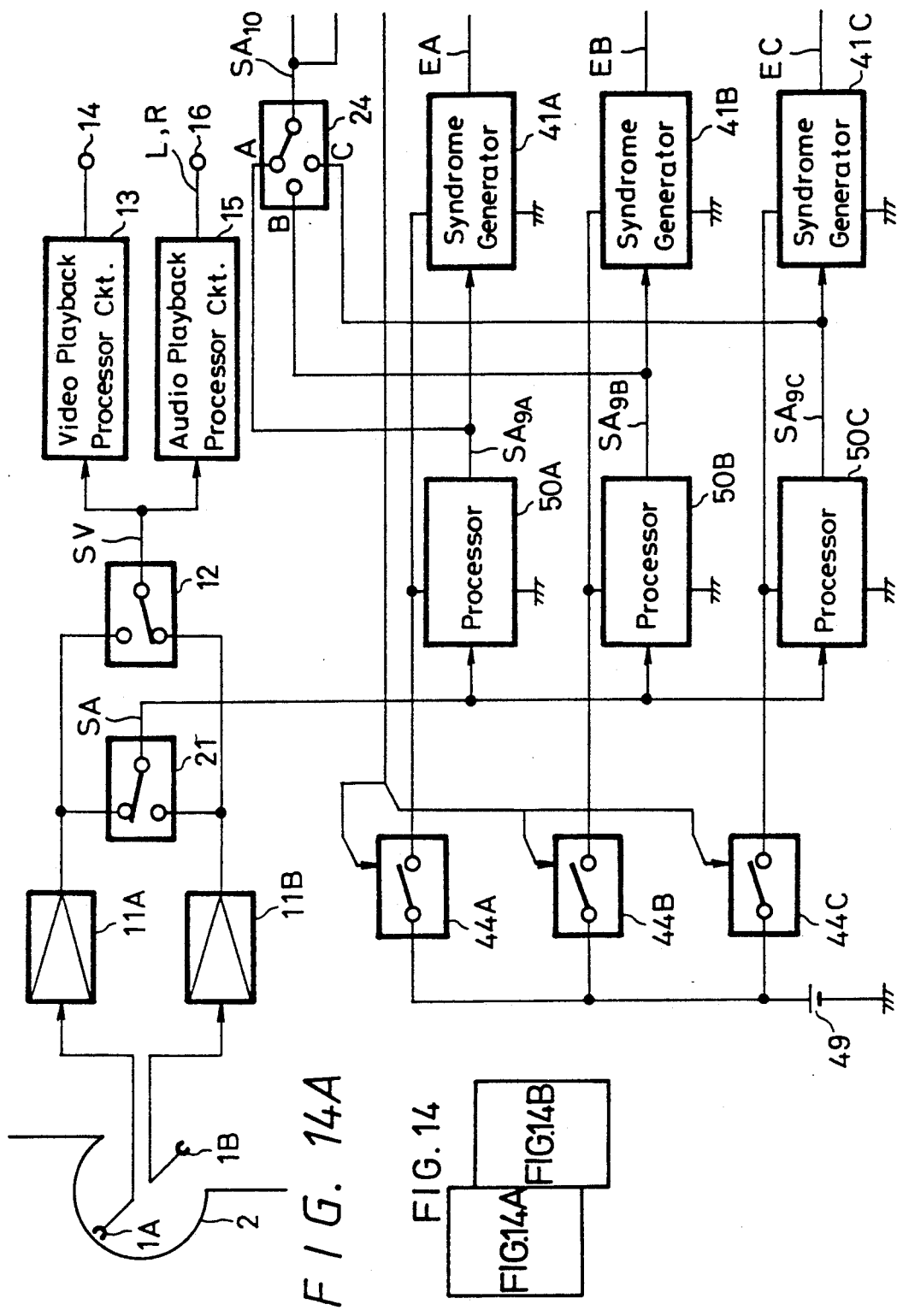

Yet another embodiment of the present invention is illustrated in FIGS. 14A and 14B. Here, the processing circuitry used to process the digital signal SA reproduced from tape 2 is implemented by respective processors 50A, 50B and 50C, each adapted to execute a respective algorithm which functions to equalize, waveshape and synchronize the reproduced digital signal. Each algorithm differs somewhat from the others and may be thought of as being matched to the expected transmission characteristics of a particular playback channel. Since these transmission characteristics may differ from device to device, and particularly when tape of different quality and recording characteristics is used, the effect of using processors 50A-50C is analogous to that of using different equalizer and waveshaping circuits.

It is expected that, for a given operating condition, the error rate imparted to the digital signal processed by each processor will differ. Syndrome generators 41A-41C produce error indications EA-EC representing such error rates; and controller 42 senses the error signal having the lowest value. As before, switch 24 is set to couple the processed digital signal exhibiting the most favorable error rate to the demodulating circuitry.

The embodiments shown in FIGS. 14A and 14A also include power supply switches 44A-44C, similar to the power supply switches discussed above in conjunction with FIGS. 13A and 13B. As in the previously described embodiment, controller 42 maintains closed the energizing switch which supplies energizing power to the processor that produces the processed digital signal having the most favorable error rate. The remaining power supply switches are opened so as to conserve power. Also, controller 42 operates to close all of the power supply switches periodically and then, after the most favorable error rate is sensed, the controller opens those power supply switches that supply energizing power to the processing circuits that do not produce the digital signal having that error rate. Hence, power supply switches 44A-44C minimize power consumption.

Figures 15, 15A:
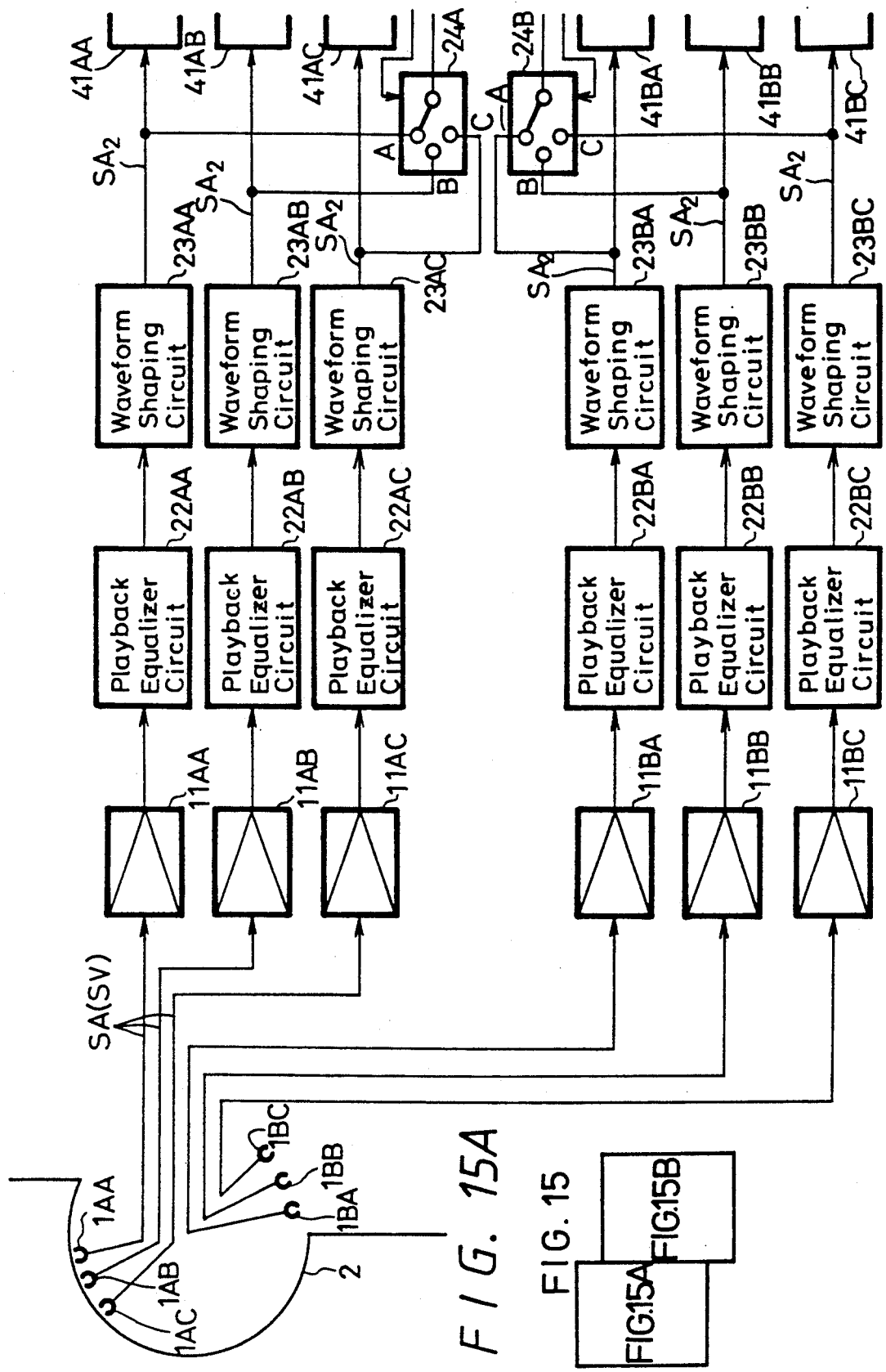
FIGS. 15, 15A and 15B are a block diagram of another embodiment of the present invention.
Figure 15B:
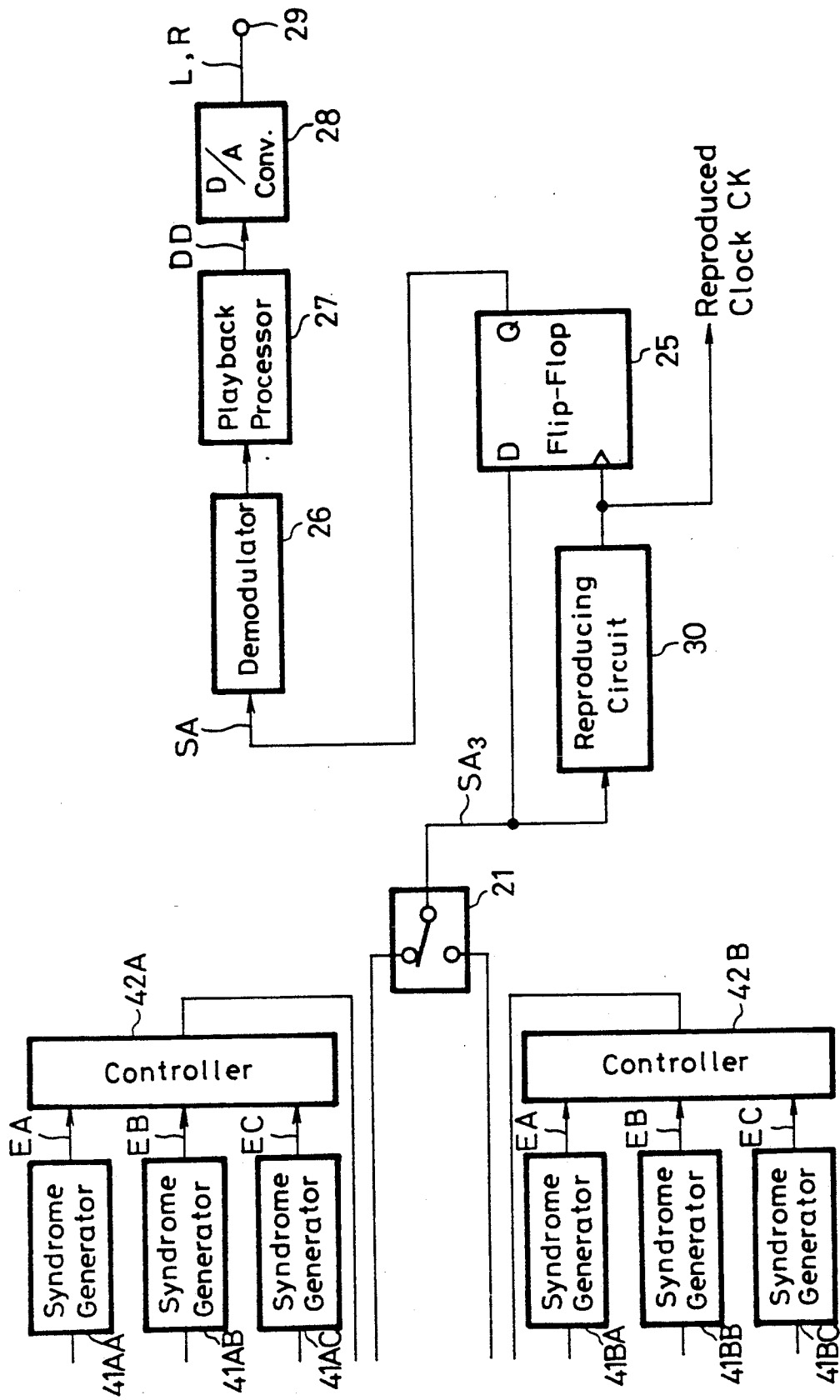

A still further embodiment of the present invention is illustrated in FIGS. 15A and 15B. It will be seen that this embodiment is somewhat similar to the embodiment discussed above in conjunction with FIG. 5, with the following noted changes. Whereas the FIG. 5 embodiment includes a pair of diametrically opposed heads 1A and 1B, the embodiment shown in FIG. 15A includes a pair of diametrically opposed head assemblies, with each assembly including a plurality of heads, such as three heads. Thus, assembly A includes heads 1AA, 1AB and 1AC, and assembly B includes heads 1BA, 1BB and 1BC. The heads in a respective assembly are slightly offset from each other so that a single track is scanned simultaneously by the three heads, with the position of each head along the scanned track being displaced along the width of the track. Thus, the three heads reproduce digital signals having different characteristics because of the relative position of each head with respect to the track.

For convenience, the circuitry used to reproduce the signals recovered from video portion SV of each track is not shown, but it will be recognized that such circuitry is similar to that described above. The circuitry used to recover the digital signals reproduced from portion SA of a track is comprised of playback amplifiers 11, playback equalizer circuits 22, waveform shaping circuits 23, syndrome generators 41, controllers 42 and selector switches 24, disposed in separate, but substantially identical, channels A and B. Each of heads 1AA, 1AB and 1AC is coupled to a respective playback channel including playback amplifiers 11AA, 11AB and 11AC, respectively. These playback amplifiers are coupled to equalizer circuits 22AA, 22AB and 22AC which, in turn, are coupled to waveform shaping circuits 23AA, 23AB and 23AC, respectively. It is appreciated that, because of the particular characteristics of the signals reproduced by heads 1AA, 1AB and 1AC, combined with the equalizing characteristics of equalizer circuits 22AA, 22AB and 22AC, as well as the operating characteristics of waveform shaping circuits 23AA, 23AB and 23AC, the processed digital signals $SA_2$ produced by each of these playback channels exhibit respectively different error rates. The processed digital signals $SA_2$ are supplied to syndrome generators 41AA, 41AB and 41AC which, as discussed above, produce error indications EA, EB and EC. Controller 42A senses the error indication having the lowest value and, thus, determines which of the processed digital signals $SA_2$ in channel A exhibits the most favorable error rate. As before, selector switch 24A is controlled by controller 42A to select the processed digital signal having the most favorable error rate. The processed digital signal selected by switch 24A is coupled to change-over switch 21, which is similar to change-over switch 21 shown in FIG. 5. Thus, as heads 1AA, 1AB and 1AC scan audio portion 2A of a track, change-over switch 21 in combination with selector switch 24A supplies to the demodulating circuitry the processed digital signal $SA_2$ in channel A having the most favorable error rate.

Similarly, heads 1BA, 1BB and 1BC are coupled to playback amplifiers 11BA, 11BB and 11BC which, in turn, are coupled to playback equalizer circuits 22BA, 22BB and 22BC in respective playback channels. These equalizer circuits are coupled to waveform shaping circuits 23BA, 23BB and 23BC to produce processed digital signals $SA_2$ in channel B which are supplied to syndrome generators 41BA, 41BB and 41BC. These syndrome generators are similar to aforementioned syndrome generators 41AA, 41AB and 41AC and produce error indications EA, EB and EC which are supplied to controller 42B.

It is appreciated that the digital signal processing circuitry coupled to heads 1BA, 1BB and 1BC in channel B is similar to and functions in a manner substantially the same as that of the aforedescribed processing circuitry coupled to heads 1AA, 1AB and 1AC in channel A. Thus, in the manner discussed above, when heads 1BA, 1BB and 1BC simultaneously scan slightly offset traces of portion 2A of a record track, the digital signals $SA_2$ produced by waveform shaping circuits 23BA-23BC exhibit respectively different error rates. These different error rates are detected by syndrome generators 41BA-41BC which produce error indications EA-EC. Controller 42B senses the error indication having the least value and sets switch 24B to couple the processed digital signal having the most favorable error rate produced by waveform shaping circuits 23BA-23BC. This processed digital signal is supplied by change-over switch 21 to the demodulating circuitry when heads 1BA-1BC scan audio portion 2A of a record track.

Although the processing circuitry used to produce the processed digital signals $SA_2$ is shown in FIG. 15A as being comprised of individual channels of cascaded equalizer and waveform shaping circuits connected to receive a digital signal reproduced by a respective one of the plurality of heads included in each head assembly, it will be appreciated that other embodiments of the processing circuitry may be used, such as those embodiments shown and described hereinabove in conjunction with the block diagrams of FIGS. 5, 8, 10, 12, 13 and 14. Suffice it to say that, in all of these embodiments, when used in the block diagram of FIG. 15, the plural playback heads in each head assembly define a plurality of playback channels, each having a respective processing circuit included therein, and the one processing circuit which provides the digital signal having the most favorable error rate is selected to couple that digital signal to demodulating circuitry.

Although FIGS. 15A and 15B illustrate selector switch 21 as being coupled to receive the processed digital signals selected either by switch 24A or 24B, it will be appreciated that this embodiment may be modified to provide plural channels of processing circuits for common use by the digital signals reproduced by head assembly A or by head assembly B. In this modification, selector switch 21 may be provided with two sets of input terminals and one set of output terminals, with the two sets of input terminals being connected to playback amplifiers 11AA-11AC and to playback amplifiers 11BA-11BC, respectively, and the one set of output terminals being connected to equalizer circuits 22AA-22AC. With this configuration, equalizer circuits 22BA-22BC, waveform shaping circuits 23BA-23BC, switch 24B, syndrome generators 41BA-41BC and controller 42B may be omitted.

While the present invention has been particularly shown and described with reference to preferred embodiments in particular environments, it will be readily appreciated by those of ordinary skill in the art that various changes and modifications may be made without departing from the spirit and scope of the invention. For example, the present invention admits of wider application and need not be used solely to recover PCM audio signals recorded on an 8-mm video recording tape. More generally, digital signals representing virtually any type of information may be recovered from magnetic media, such as magnetic tape, disks, sheets, stripes, etc., or from other media, such as optical disks or other optical recording media. Also, various combinations of processing circuitry components may be used to implement the digital signal processing circuit that is used to produce the digital signal $SA_2$ that is selected for demodulation.

It is, therefore, intended that the appended claims be interpreted as covering the embodiments disclosed herein, those alternatives and modifications which have been discussed above and all equivalents thereto.

What is claimed is:

1. Apparatus for reproducing a digital signal from a record medium, comprising:
    playback means for playing back a digital signal from said record medium;
    plural processing means supplied with the played back digital signal for processing said digital signal, each processing means exhibiting respective characteristics to impart a different error rate to the digital signal processed thereby;
    plural error indicating means coupled to said plural processing means for indicating the error rates of the digital signals processed by the respective processing means and for detecting the processed digital signal having a most favorable error rate; and
    selecting means coupled to said plural processing means for selecting the processing means which produces the processed digital signal having the most favorable error rate.

2. The apparatus of claim 1 wherein said plural processing means includes delay means for delaying the processed digital signal selected by said selecting means.

3. The apparatus of claim 2 wherein said delay means provides time delay compensation for delays in the detection by said detecting means of the processed digital signal having the most favorable error rate.

4. The apparatus of claim 1 wherein said plural processing means includes power supply means for supplying operating power to at least respective ones of said plural processing means, and means for interrupting the power supplied to those processing means which do not produce the processed digital signal having said most favorable error rate.

5. The apparatus of claim 4 wherein said means for interrupting is cyclically operable such that power is cyclically supplied to said respective processing means and said detecting means cyclically detects the processed digital signal having the most favorable error rate.

6. The apparatus of claim 1 wherein said plural processing means comprises plural equalizing means having respectively different equalizing characteristics.

7. The apparatus of claim 1 wherein said plural processing means comprises plural waveshaping means for shaping the played back digital signal to a "1" or "0".

8. The apparatus of claim 7 wherein said plural waveshaping means comprises plural pulse detecting means supplied with respectively different pulse threshold levels for producing "1" if the played back digital signal supplied thereto exceeds the supplied pulse threshold level.

9. The apparatus of claim 8 wherein each pulse detecting means comprises a comparator supplied with said played back digital signal and said respective pulse threshold level.

10. The apparatus of claim 1 wherein said plural processing means comprises plural synchronizing means for synchronizing the played back digital signal with clock signals of respective phases, and clock generating means for generating clock signals of respectively different phases.

11. The apparatus of claim 10 wherein said clock generating means includes a source of clock signals and delay means for delaying said clock signals by respectively different amounts to produce said clock signals of respectively different phases.

12. The apparatus of claim 11 wherein said source of clock signals comprises clock signal recovery means supplied with the played back digital signal to recover clock signals therefrom.

13. The apparatus of claim 12 wherein said plural synchronizing means comprises plural clocked flip-flop circuits each having a data input terminal coupled to receive the played back digital signal, a clock input terminal coupled to receive a clock signal of respective phase and an output terminal for producing a digital signal synchronized to said clock signal of respective phase.

14. The apparatus of claim 1 wherein said playback means comprises plural playback heads for scanning said record medium substantially simultaneously to produce plural parallel channels of played back digital signals, each channel being coupled to a respective processing means.

15. The apparatus of claim 14 wherein the digital signal reproduced from the record medium is recorded in successive tracks on said record medium and said plural playback heads are offset from each other to simultaneously scan a track in offset relation.

16. The apparatus of claim 1 wherein the digital signal reproduced from the record medium is a PCM audio signal.

17. The apparatus of claim 16 wherein the record medium comprises a magnetic tape having successive slant tracks recorded thereon, each slant track having a video signal and said PCM audio signal recorded therein; and said playback means comprises magnetic transducer means for playing back the video and PCM audio signals from a slant track, and separating means for separating the played back PCM audio signals from the played back video signals.

18. The apparatus of claim 1 wherein said plural indicating means includes sensing means for sensing the lowest error rate indicated by said plural error indicating means.

19. The apparatus of claim 18 wherein said selecting means comprises switch means responsive to said sensing means for coupling to further apparatus the processing means which provides the digital signal having the lowest sensed error rate.

20. The apparatus of claim 1 wherein each error indicating means comprises a syndrome generator to sense the error rate of the particular processed digital signal supplied thereto by a respective one of the processing means.

* * * * *